(12) United States Patent
Moon et al.

(10) Patent No.: US 9,544,118 B2
(45) Date of Patent: Jan. 10, 2017

(54) COMMUNICATION METHOD OF TERMINAL IN CARRIER AGGREGATION SYSTEM, AND TERMINAL

(75) Inventors: Sung Ho Moon, Anyang-si (KR); Min Seok Noh, Anyang-si (KR); Jae Hoon Chung, Anyang-si (KR); Seung Hee Han, Anyang-si (KR); So Yeon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 301 days.

(21) Appl. No.: 13/512,168

(22) PCT Filed: Nov. 19, 2010

(86) PCT No.: PCT/KR2010/008189
§ 371 (c)(1),
(2), (4) Date: May 25, 2012

(87) PCT Pub. No.: WO2011/065703
PCT Pub. Date: Jun. 3, 2011

(65) Prior Publication Data
US 2013/0070690 A1  Mar. 21, 2013

Related U.S. Application Data

(60) Provisional application No. 61/264,664, filed on Nov. 26, 2009, provisional application No. 61/267,388, (Continued)

(30) Foreign Application Priority Data

Nov. 8, 2010 (KR) .......................... 10-2010-0110307

(51) Int. Cl.
*H04W 72/04* (2009.01)
*H04L 5/00* (2006.01)
*H04L 1/00* (2006.01)

(52) U.S. Cl.
CPC ............ *H04L 5/0053* (2013.01); *H04L 1/0029* (2013.01); *H04L 5/001* (2013.01); *H04W 72/042* (2013.01); *H04W 72/0406* (2013.01)

(58) Field of Classification Search
CPC ... H04L 5/001; H04L 5/0053; H04W 72/0406; H04W 72/042
See application file for complete search history.

(56) References Cited

U.S. PATENT DOCUMENTS

2009/0290538 A1  11/2009 Kim et al.
2010/0322158 A1* 12/2010 Lee et al. ...................... 370/329
(Continued)

FOREIGN PATENT DOCUMENTS

KR  10-2009-0111271 A  10/2009

OTHER PUBLICATIONS

3GPP TSG RAN WG1 #57bis, R1-092500, "Component carrier indication by PDCCH for multiple carrier aggregation in LTE-Advanced", LG Electronics, Agenda item: 15.4, Jun. 29-Jul. 3, 2009.

(Continued)

*Primary Examiner* — Omer S Mian
(74) *Attorney, Agent, or Firm* — Birch, Stewart, Kolasch & Birch, LLP

(57) ABSTRACT

The present invention provides a communication method of a terminal in a carrier aggregation system. The method comprises: determining indexes relative to a plurality of downlink component carriers and a plurality of uplink component carriers; receiving, from a base station, DCI through at least one downlink component carrier among the plurality of downlink component carriers; and transmitting an uplink signal to the base station through an uplink component carrier determined on the basis of DCI, wherein the DCI includes an index that indicates the uplink component carrier which transmits the uplink signal among the plurality of uplink component carriers.

3 Claims, 40 Drawing Sheets

Related U.S. Application Data filed on Dec. 7, 2009, provisional application No. 61/299,352, filed on Jan. 29, 2010, provisional application No. 61/325,827, filed on Apr. 20, 2010, provisional application No. 61/328,626, filed on Apr. 27, 2010.

(56) References Cited

U.S. PATENT DOCUMENTS

| | | | |
|---|---|---|---|
| 2011/0081913 A1* | 4/2011 | Lee et al. | 455/450 |
| 2011/0134877 A1* | 6/2011 | Noh et al. | 370/329 |
| 2011/0141985 A1* | 6/2011 | Larsson | H04L 5/0064 |
| | | | 370/329 |
| 2011/0267957 A1* | 11/2011 | Du et al. | 370/241 |

OTHER PUBLICATIONS

3GPP TSG RAN WG1 #57bis, R1-092505, "UE-specific Carrier Assignment for LTE-Advanced", LG Electronics, Agenda item: 15.4, Jun. 29-Jul. 3, 2009.

3GPP TSG RAN WG1 #57bis, R1-092662, "PHICH Mapping in Asymmetric Carrier Aggregation", Samsung, Agenda item: 15.4, Jun. 29-Jul. 3, 2009.

Huawei, "Further Considerations on Cross-Carrier PDCCH Scheduling," 3GPP TSG RAN WG1 meeting #59, Jeju, Korea, Nov. 9-13, 2009 (available Nov. 3, 2009), R1-094700, 4 pages.

Samsung, "Configuration of Carrier Indicator Information Element," 3GPP TSG RAN WG1 #59, Jeju, Korea, Nov. 9-13, 2009 (available Nov. 3, 2009), R1-094568, p. 1-4.

\* cited by examiner (a) # of DL CC (component carrier) ># of UL CC (b) # of UL CC > # of DL CC Linkage A Linkage B Linkage C Linkage A Linkage B Linkage C Linkage A Linkage B Linkage C Linkage A Linkage B Linkage C Linkage A
 Linkage B
 Linkage C (a) Option 1

(b) Option 2 of # COMMUNICATION METHOD OF TERMINAL IN CARRIER AGGREGATION SYSTEM, AND TERMINAL

This application is the National Phase of PCT/KR2010/008189 filed on Nov. 19, 2010, which claims priority under 35 U.S.C. 119(e) to U.S. Provisional Application No. 61/264,664 filed on Nov. 26, 2009, 61/267,388 filed on Dec. 7, 2009, 61/299,352 filed on Jan. 29, 2010, 61/325,827 filed on Apr. 4, 2010 and 61/328,626 filed on Apr. 27, 2010 and under 35 U.S.C. 119(a) to Patent Application No. 10-2010-0110307 filed in the Republic of Korea on Nov. 8, 2010, all of which are hereby expressly incorporated by reference into the present application.

TECHNICAL FIELD

The present invention relates to wireless communication and, more specifically, to a method of user equipment communicating with a base station in a carrier aggregation system and user equipment using the method.

BACKGROUND ART

One of the most important requirements of the next-generation wireless communication system is to support a requirement for a high data transfer rate. To this end, research is being carried out on various technologies, such as Multiple Input Multiple Output (MIMO) and Cooperative Multiple Point transmission (CoMP), and a relay, but the most basic and stable solution is to increase the bandwidth.

However, frequency resources are now in a saturation state, and various technologies are partially being used in wide-ranging frequency bands. For this reason, as a scheme for securing a wide bandwidth in order to satisfy requirements for a higher data transfer rate, a Carrier Aggregation (CA) having a concept in which each of scattered bands is designed to satisfy a basic requirement capable of operating an independent system and a number of bands are bundled into one system is being introduced. Here, a band that may be independently operated is defined as a Component Carrier (CC).

In order to support an increasing transmit capacity, the bandwidth of the recent 3GPP LTE-A or 802.16m is extending up to 20 MHz or higher. In this case, one or more CCs are aggregated to support a wide band. For example, if one CC corresponding to a bandwidth of 5 MHz, four carriers are aggregated in order to support a maximum of a 20 MHz bandwidth.

As described above, the carrier aggregation system uses a plurality of CCs. Here, a CC on which downlink control information is received from a base station and a CC on which downlink data is received from the base station may be different configured in user equipment. Alternatively, a link between a CC on which downlink control information is received and a CC on which an uplink signal is transmitted may comply with different linkage from a link defined in the existing LTE. This scheduling method is called cross-carrier scheduling. In the case where the cross-carrier scheduling is applied, if it is not identified that downlink control information transmitted by a base station is about what CC, it is difficult for user equipment to communicate with the base station. There is a need for a method of user equipment efficiently communicating with a base station by providing a method of indexing each CC in a carrier aggregation system.

DISCLOSURE

Technical Problem

An object of present invention is to provide a communication method of user equipment in a carrier aggregation system and user equipment using the method.

Technical Solution

A communication method of UE in a carrier aggregation system according to an aspect of the present invention includes the steps of determining indices for a plurality of downlink component carriers and a plurality of uplink component carriers; receiving Downlink Control Information (DCI) through at least one of the plurality of downlink component carriers from a base station; and transmitting an uplink signal to the base station through an uplink component carrier determined based on the DCI, wherein the DCI includes an index indicating the uplink component carrier through which the uplink signal is transmitted, from among the plurality of uplink component carriers.

The indices for the plurality of downlink component carriers and the indices for the plurality of uplink component carriers may have overlapping values. The step of receiving linkage between the plurality of downlink component carriers and the plurality of uplink component carriers from the base station through a high layer signal is further included. An uplink component carrier linked to the at least one downlink component carrier may have an identical value with the at least one downlink component carrier.

The uplink component carriers other than the linked uplink component carrier, from among the plurality of uplink component carriers, may have cyclic indices in frequency-ascending order or in frequency-descending order.

The indices for the plurality of downlink component carriers and the indices for the plurality of uplink component carriers may be determined based on a high layer signal transmitted by the base station.

At least one of the plurality of downlink component carriers may maintain the same value before and after an index reconfiguration.

The step of receiving linkage between the plurality of downlink component carriers and the plurality of uplink component carriers from the base station through a high layer signal is further included. The plurality of uplink component carriers may have the same values as downlink component carriers linked to the respective uplink component carriers.

The indices for the plurality of downlink component carriers may be determined using a Radio Resource Control (RRC) signal received from the base station.

The indices for the plurality of downlink component carriers and the indices for the plurality of uplink component carriers may have vales not overlapping with one another. The plurality of downlink component carriers and the plurality of uplink component carriers may have cyclic indices in frequency-ascending order or in frequency-descending order. The indices for the plurality of downlink component carriers and the indices for the plurality of uplink component carriers may be determined using an RRC signal received from the base station. The step of receiving linkage between the plurality of downlink component carriers and the plurality of uplink component carriers from the base station through a high layer signal is further included. The index for each of the plurality of uplink component carriers may have the index of a downlink component carrier, linked to the uplink component carrier, and a specific offset value.

The index of an uplink component carrier linked to the downlink component carrier through which the DCI is received may be determined as a maximum value determined based on the number of bits of a field including the index.

If the downlink component carrier included in the plurality of downlink component carriers and the uplink component carrier included in the plurality of uplink component carriers have different bandwidths, the downlink component carrier and the uplink component carrier may have indices not overlapping with each other.

User equipment in a carrier aggregation system according to another aspect of the present invention includes a Radio Frequency (RF) unit transmitting and receiving a radio signal and a processor connected to the RF unit, wherein the processor determines indices for a plurality of downlink component carriers and a plurality of uplink component carriers; receiving Downlink Control Information (DCI) through at least one of the plurality of downlink component carriers from a base station, and transmitting an uplink signal to the base station through an uplink component carrier determined based on the DCI, wherein the DCI includes an index indicating the uplink component carrier through which the uplink signal is transmitted, from among the plurality of uplink component carriers.

Advantageous Effects

According to the present invention, in a carrier aggregation system using a plurality of CCs, user equipment may efficiently communicate with a base station in the carrier aggregation system because an indexing method capable of distinguishing the CCs from one another is provided. Since applied CCs can be accurately identified regarding pieces of downlink control information having the same bit size, user equipment can efficiently communicate with a base station in a carrier aggregation system.

MODE FOR INVENTION

The following technologies may be used in a variety of multiple access schemes, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA may be implemented using radio technology, such as Universal Terrestrial Radio Access (UTRA) or CDMA2000. TDMA may be implemented using radio technology, such as Global System for Mobile communications (GSM)/General Packet Radio Service (GPRS)/Enhanced Data Rates for GSM Evolution (EDGE). OFDMA may be implemented using radio technology, such as Institute of Electrical and Electronics Engineers (IEEE) 802.11 (Wi-Fi), IEEE 802.16 (WiMAX), IEEE 802.20, or Evolved UTRA (E-UTRA). IEEE 802.16m is an evolution of IEEE 802.16e, and it provides backward compatibility with systems based on IEEE 802.16e. UTRA is part of a Universal Mobile Telecommunications System (UMTS). $3^{rd}$ Generation Partnership Project (3GPP) Long Term Evolution (LTE) is part of an Evolved UMTS (E-UMTS) using E-UTRA, and it adopts OFDMA in downlink and adopts SC-FDMA in uplink. LTE-Advanced (LTE-A) is the evolution of LTE.

In order to clarify a description, a condition that the present invention is applied to an LTE-A system is assumed and described, but the technical spirit of the present invention is not limited thereto.

Figure 1:
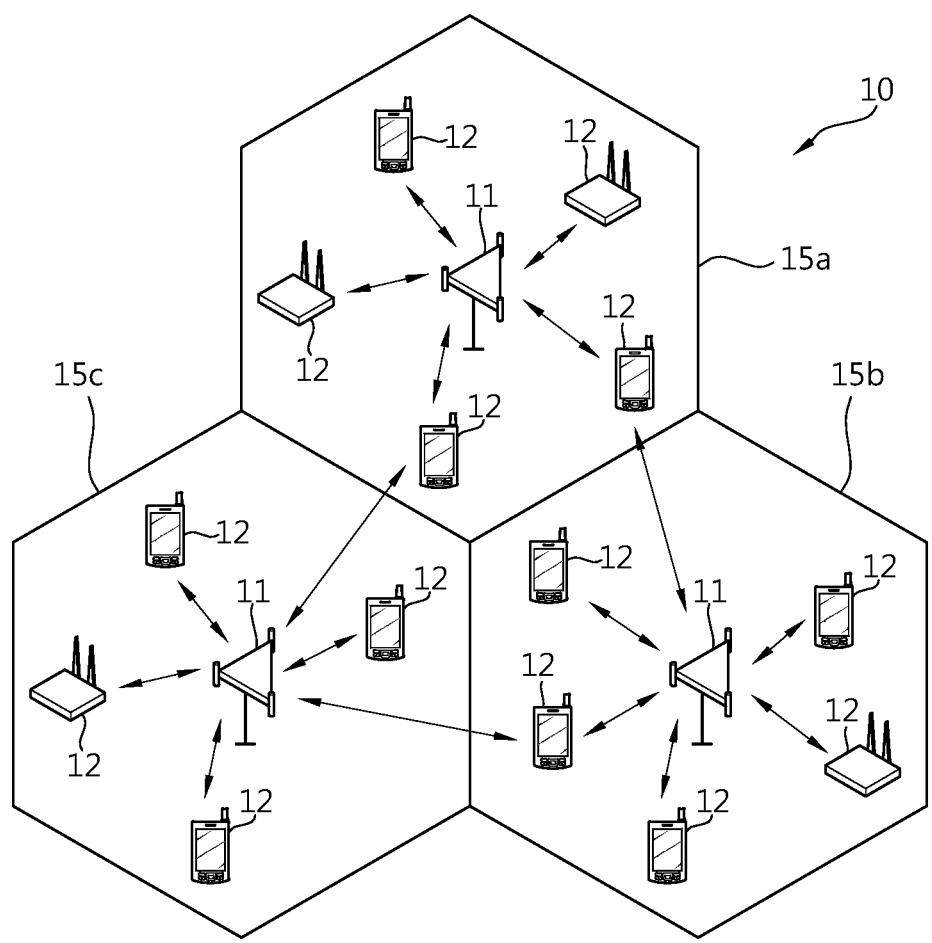
FIG. 1 shows an example of a wireless communication system in which the present invention may be implemented.

FIG. 1 shows an example of a wireless communication system in which the present invention may be implemented.

The wireless communication system 10 includes one or more Base Stations (BSs) 11. The BSs 11 provide communication services to respective geographical areas (commonly called cells) 15a, 15b, and 15c. Each of the cells may be divided into a plurality of areas (also called sectors). User Equipment (UE) 12 may be fixed or mobile and may also be called another terminology, such as a Mobile Station (MS), a Mobile Terminal (MT), a User Terminal (UT), a Subscriber Station (SS), a wireless device, a Personal Digital Assistant (PDA), a wireless modem, or a handheld device. The BS 11 commonly refers to a fixed station communicating with the UEs 12, and it may also be called another terminology, such as an evolved NodeB (eNB), a Base Transceiver System (BTS), or an access point.

UE commonly belongs to one cell. The cell to which the UE belongs is called a serving cell. A BS providing the serving cell with communication service is called a serving BS. Another cell neighboring the serving cell exists because a wireless communication system is a cellular system. The cell neighboring the serving cell is called a neighbor cell. A BS providing the neighbor cell with communication service is called a neighbor BS. The serving cell and the neighbor cell are relatively determined on the basis of UE.

This technology may be used in downlink and uplink. In general, downlink refers to communication from the BS 11 to the UE 12, and uplink refers to communication from the UE 12 to the BS 11. In downlink, a transmitter may be part of the BS 11, and a receiver may be part of the UE 12. In uplink, a transmitter may be part of the UE 12, and a receiver may be part of the BS 11.

The wireless communication system may be any one of a Multiple-In Multiple-Out (MIMO) system, a Multiple Input Single Output (MIMO) system, a Single Input Single Output (SISO) system, and a Single Input Multiple Output (SIMO) system. The MIMO system uses a number of transmit antennas and a number of receive antennas. The MISO system uses a number of transmit antennas and one receive antenna. The SISO system uses one transmit antenna and one receive antenna. The SIMO system uses one transmit antenna and a number of receive antennas.

Hereinafter, a transmit antenna refers to a physical or logical antenna used to transmit one signal or stream, and a receive antenna refers to a physical or logical antenna used to receive one signal or stream.

Figure 2:
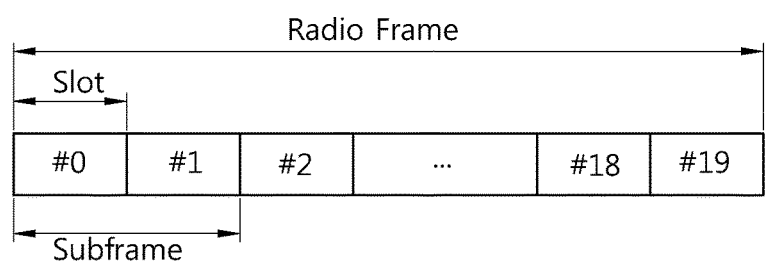
FIG. 2 shows the format of a radio frame in 3GPP LTE.

FIG. 2 shows the format of a radio frame in 3GPP LTE.

For the format of the radio frame, reference may be made to Paragraph 5 of $3^{rd}$ Generation Partnership Project (3GPP) TS 36.211 V8.2.0 (2008-03) "Technical Specification Group Radio Access Network; Evolved Universal Terrestrial Radio Access (E-UTRA); Physical channels and modulation (Release 8)". Referring to FIG. 2, the radio frame includes 10 subframes, and one subframe includes two slots. The slots within the radio frame are assigned slot numbers from #0 to #19. The time that it takes to transmit one subframe is called a Transmission Time Interval (TTI). The TTI may be called a scheduling unit for data transmission. For example, the length of one radio frame may be 10 ms, the length of one subframe may be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbols are used to represent one symbol period because 3GPP LTE uses OFDMA in downlink and may be called another terminology according to a multiple access scheme. For example, if SC-FDMA is used as an uplink multiple access scheme, relevant symbols may be called SC-FDMA symbols. A Resource Block (RB) is a resource allocation unit, and it includes a plurality of contiguous subcarriers in one slot. The format of the radio frame is only an example. Thus, the number of subframes included in a radio frame, the number of slots included in a subframe, or the number of OFDM symbols included in a slot may be changed in various ways.

In 3GPP LTE, one slot is defined to include 7 OFDM symbols in a normal Cyclic Prefix (CP), and one slot is defined to include 6 OFDM symbols in an extended CP.

Figure 3:
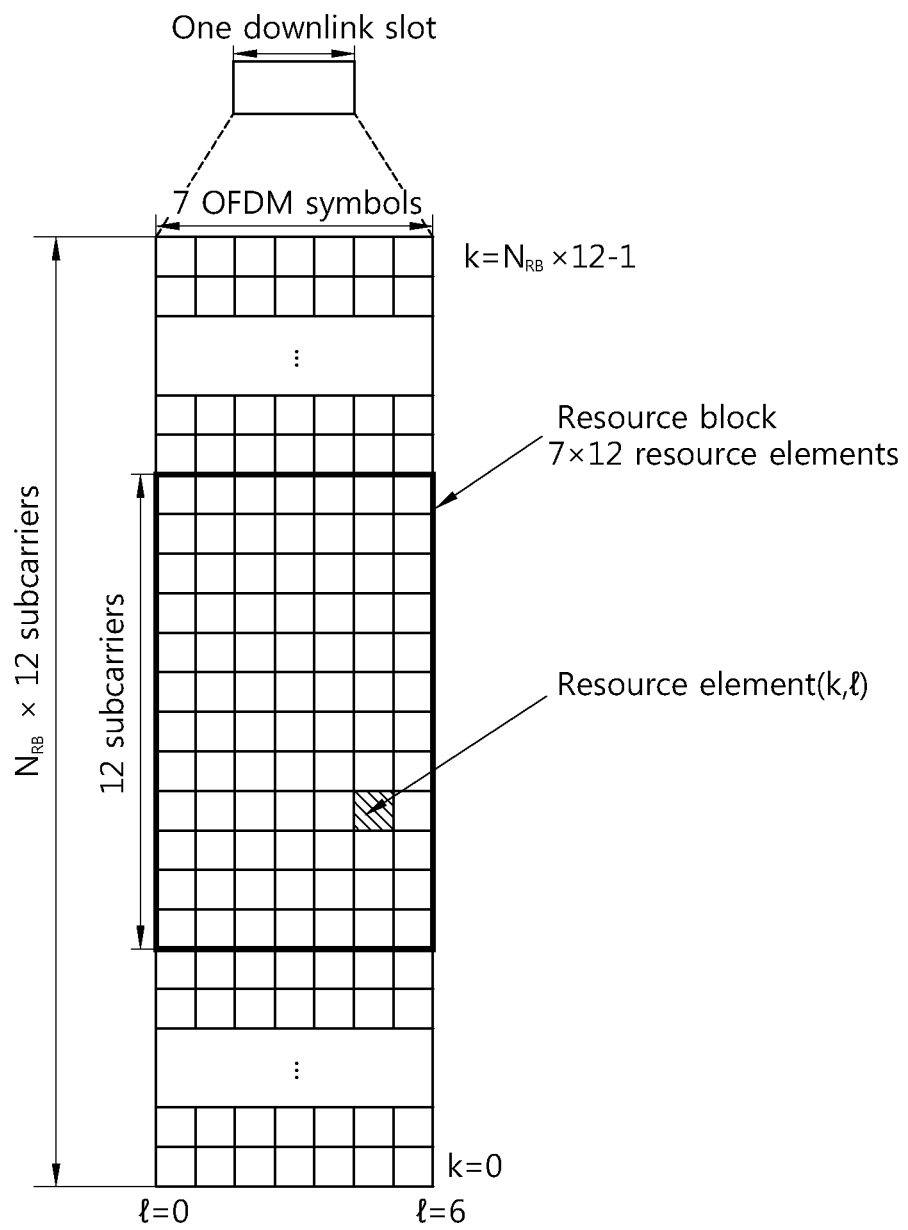
FIG. 3 shows an example of a resource grid for one downlink slot.

FIG. 3 shows an example of a resource grid for one downlink slot.

The downlink slot includes a plurality of OFDM symbols in the time domain and $N_{RB}$ resource blocks in the frequency domain. The number of resource blocks $N_{RB}$ included in the downlink slot is dependent on a downlink transmission bandwidth configured in a cell. For example, in an LTE system, the number of resource blocks $N_{RB}$ may be any one of 6 to 110. One resource block includes a plurality of subcarriers in the frequency domain. An uplink slot may have the same structure as a downlink slot.

Each of elements on the resource grid is called a resource element. The resource element on the resource grid may be identified by an index pair (k, l) within a slot. Here, k (k=0, . . . , $N_{RB} \times 12-1$) indicates a subcarrier index in the frequency domain, and l (l=0, . . . , 6) indicates an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited thereto. The number of OFDM symbols and the number of subcarriers may be changed in various ways depending on the length of a CP, frequency spacing, etc. For example, the number of OFDM symbols is 7 in case of a normal CP, and the number of OFDM symbols is 6 in case of an extended CP. The number of subcarriers in one OFDM symbol may be one of 128, 256, 512, 1024, 1536, and 2048.

Figure 4:
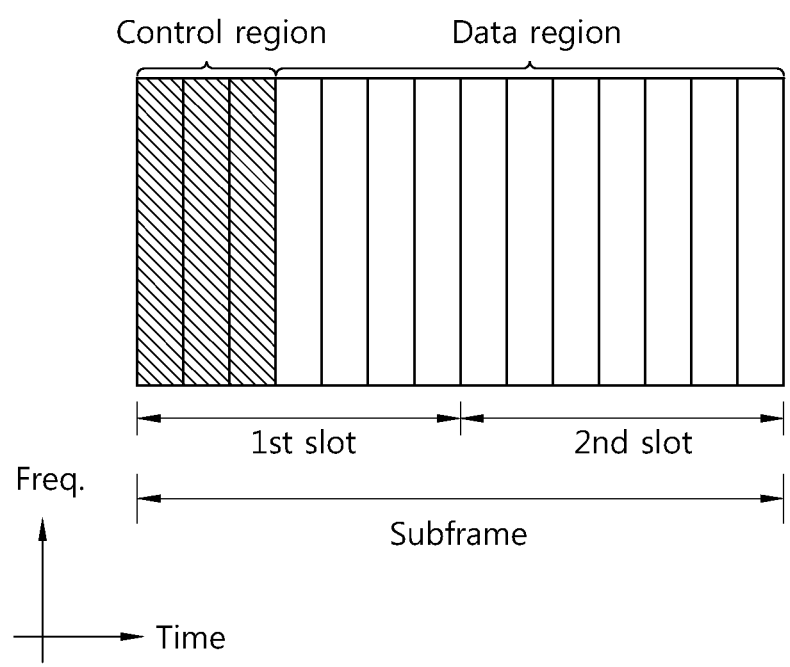
FIG. 4 shows the format of a downlink subframe.

FIG. 4 shows the structure of a downlink subframe.

The downlink subframe includes two slots in the time domain, and each of the slots includes 7 OFDM symbols in a normal CP. A maximum of 3 OFDM symbols (a maximum of 4 OFDM symbols in a 1.4 MHz bandwidth) of the first slot within the subframe correspond to a control region to which control channels are allocated, and the remaining OFDM symbols correspond to a data region to which Physical Downlink Shared Channels (PDSCHs) are allocated.

A PDCCH may carry the resource allocation of a Downlink-Shared Channel (DL-SCH) (this is also called a DL grant) and a transmission format thereof, resource allocation information about an Uplink Shared Channel (UL-SCH) (this is also called an UL grant), paging information on a PCH, system information on a DL-SCH, the resource allocation of a high layer control message, such as a random access response transmitted on a PDSCH, a set of transmit power control commands for individual UEs within a specific UE group, the activation of a Voice over Internet Protocol (VoIP), and so on. The above-described control information transmitted on the PDCCH is called Downlink Control Information (DCI).

The PDCCH is transmitted on one Control Channel Element (CCE) or an aggregation of contiguous several CCEs. The CCE is a logical allocation unit used to provide the PDCCH with a coding rate according to the state of a radio channel. The CCE corresponds to a plurality of Resource Element Groups (REGs). The REG includes a plurality of Resource Elements (REs). The format of the PDCCH and the number of bits of an available PDCCH are determined by an association between the number of CCEs and a coding rate provided by the CCEs.

A BS determines a format based on DCI to be transmitted to UE and attaches Cyclic Redundancy Check (CRC) to control information. A unique Radio Network Temporary Identifier (RNT) is masked to the CRC according to the owner or usage of the PDCCH. If a PDCCH is for specific UE, the unique ID (e.g. a Cell-RNTI (C-RNTI)) of UE may be masked to the CRC. Alternatively, if a PDCCH is for a paging message, a paging indication ID (e.g., a Paging-RNTI (P-RNTI)) may be masked to the CRC. If a PDCCH is for a System Information Block (SIB), a System Information-RNTI (SI-RNTI) may be masked to the CRC. In order to indicate a random access response (i.e., a response to the transmission of a random access preamble by UE), a Random Access-RNTI (RA-RNTI) may be masked to the CRC.

DCI on a PDCCH is received through blind decoding. A plurality of candidate PDCCHs may be transmitted within the control region of one subframe. UE monitors a plurality of candidates PDCCHs for every subframe. Here, the monitoring means that UE attempts to decode each of the PDCCHs according to a PDCCH format (more specifically, a DCI format) that is monitored. The UE finds its own PDCCHs by monitoring an aggregation of the PDCCH candidates within the subframe. For example, if a CRC error is not detected in a PDCCH by demasking the ID (i.e. a Cell-Radio Network Temporary Identifier (C-RNTI)) of the UE within the PDCCH, the UE detects the PDCCH as a PDCCH having its own DCI.

In the above process, the UE does not know that its own PDCCH is transmitted at which place within the control region by using what CCE aggregation level or what DCI format. In order to reduce load resulting from blind decoding in 3GPP LTE, a search space (SS) is used. The search space may be called the monitoring set of CCEs for a PDCCH. UE monitors the PDCCH within a relevant search space. The search space is divided into a common search space ad a UE-specific search space. The common search space is a space where a PDCCH having common control information is searched for. The common search space consists of 16 CCEs having CCE indices 0 to 15 and support a PDCCH having a CCE aggregation level of {4, 8}. However, a PDCCH (e.g., DCI formats 0 and 1A) carrying UE-specific information may be transmitted even in the common search space. The UE-specific search space supports a PDCCH having a CCE aggregation level of {1, 2, 4, 8}.

Figure 5:
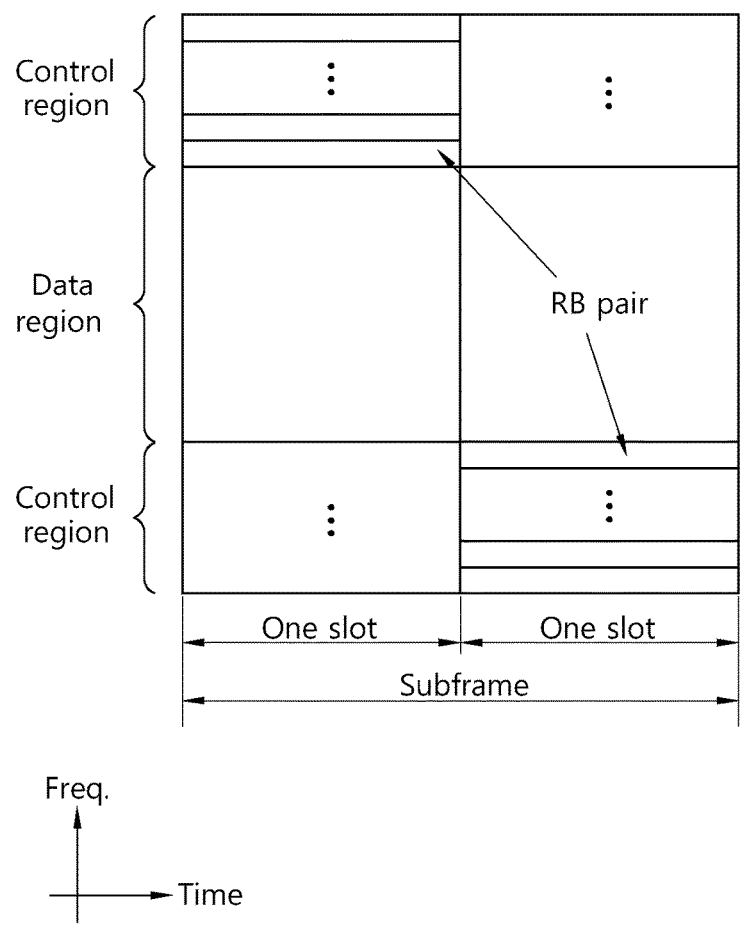
FIG. 5 shows the format of an uplink subframe.

FIG. 5 shows the structure of an uplink subframe.

The uplink subframe may be divided into a control region and a data region in the frequency domain. A Physical Uplink Control Channel (PUCCH) on which uplink control information is transmitted is allocated to the control region. A Physical Uplink Shared Channel (PUSCH) on which data is transmitted is allocated to the data region. In order to maintain the characteristic of a single carrier, UE does not transmit the PUCCH and the PUSCH at the same time.

A PUCCH for one UE is allocated as an RB pair within a subframe. Resource blocks included in the RB pair occupy different subcarriers in a first slot and a second slot. A frequency occupied by a resource block belonging to a RB pair to which a PUCCH is allocated is changed on the basis of a slot boundary. Thus is said that the RB pair allocated to the PUCCH has been frequency-hopped in the slot boundary. UE may obtain a frequency diversity gain by transmitting uplink control information through different subcarriers according to time. m is a position index indicating the position of a logical frequency domain of an RB pair allocated to a PUCCH within a subframe.

Uplink control information transmitted on a PUCCH includes Hybrid Automatic Repeat request (HARQ) Acknowledgement (ACK)/Non-acknowledgement (NACK), a Channel Quality Indicator (CQI) indicating a downlink channel state, a Scheduling Request (SR) (i.e., an uplink radio resource allocation request), etc.

A PUSCH is mapped to an Uplink Shared Channel (UL-SCH) (i.e., a transport channel). Uplink data transmitted on the PUSCH may be a transport block (i.e., a data block for an UL-SCH transmitted during a TTI). The transport block may be user information. Alternatively, uplink data may be multiplexed data. The multiplexed data may be data in which the transport block for the UL-SCH and control information have been multiplexed. For example, control information multiplexed with data may include a CQI, a Precoding Matrix Indicator (PMI), HARQ, a Rank Indicator (RI), etc. Alternatively, the uplink data may consist of only control information.

In an LTE-A system, an SC-FDMA transmission scheme is used in uplink. A transmission scheme in which IFFT is performed after DFT spreading is called SC-FDMA. The SC-FDMA may also be called DFT-spread OFDM (DFT-s OFDM). In SC-FDMA, a Peak-to-Average Power Ratio (PAPR) or a Cubic Metric (CM) may be lowered. If the SC-FDMA transmission scheme is used, transmission power efficiency may be increased in UE having limited power consumption because the non-linear distortion period of a power amplifier can be avoided. Accordingly, user throughput may be increased.

Meanwhile, a 3GPP LTE-A system supports a carrier aggregation system, and reference may be made to 3GPP TR 36.815 V9.0.0 (2010-3) for the carrier aggregation system.

The carrier aggregation system refers to a system in which a wireless communication system configures a wide band (i.e., a target) by collecting one or more carriers each having a smaller bandwidth than the wide band in order to support the wide band. The carrier aggregation system may be called anther terminology, such as a multiple carrier system or a bandwidth aggregation system. The carrier aggregation system may be divided into a contiguous carrier aggregation system in which carriers are contiguous to each other and a non-contiguous carrier aggregation system in which carriers are spaced apart from each other. It is hereinafter understood that, when simply referring to a multiple carrier system or a carrier aggregation system, both a case where component carriers are contiguous to each other and a case where component carriers are not contiguous to each other are included.

In a contiguous carrier aggregation system, a guard band may exist between carriers. A carrier (i.e., the subject being when one or more carriers are collected) may use a bandwidth, used in the existing system, without change for the purpose of backward compatibility with the existing system. For example, a 3GPP LTE system may support bandwidths 1.4 MHz, 3 MHz, 5 MHz, 10 MHz, 15 MHz, and 20 MHz, and a 3GPP LTE-A system may use only the bandwidths of the 3GPP LTE system in order to configure a wide band of 20 MHz or higher. Alternatively, a wide band may be configured by defining a new bandwidth without using the bandwidths of the existing system.

In a carrier aggregation system, UE may transmit or receive one or a plurality of carriers at the same time according to its capabilities. LTE-A UE may transmit or receive a plurality of carriers at the same time. LTE Rel-8 UE may transmit or receive only one carrier when each of carriers composing a carrier aggregation system is compatible with an LTE Rel-8 system. Accordingly, if the number of carriers used in uplink is identical with the number of carriers used in downlink, all component carriers need to be configured so that they are compatible with the LTE Rel-8 system.

In order to efficiently use a plurality of carriers, the plurality of carriers may be managed in Media Access Control (MAC).

Figure 6:
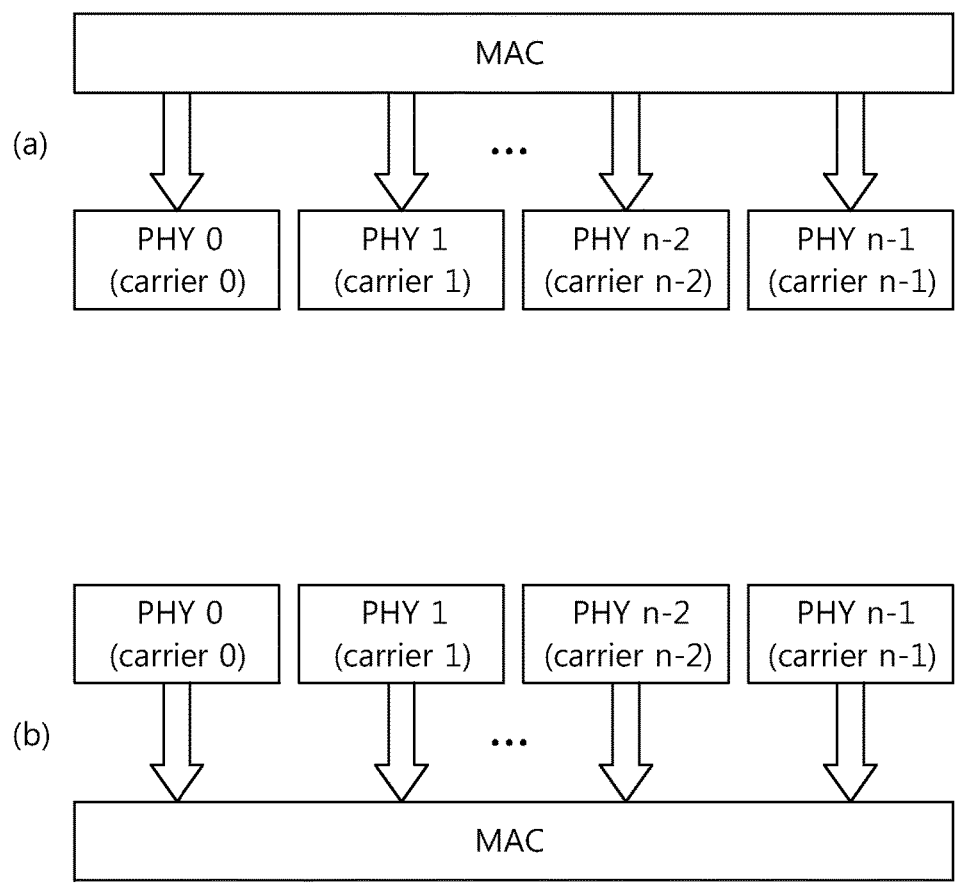
FIG. 6 shows an example of a base station and user equipment which form a carrier aggregation system.

FIG. 6 shows an example of a BS and UE which form a carrier aggregation system.

In a BS of FIG. 6(a), one MAC transmits and receives data by managing and operating all n carriers. This is true of UE of FIG. 6(b). From a standpoint of the UE, one transport block and one HARQ entity may exist in each component carrier. The UE may be scheduled to a plurality of carriers at the same time. The carrier aggregation system of FIG. 6 may be applied to both a contiguous carrier aggregation system and a non-contiguous carrier aggregation system. Carriers managed in one MAC need not to be contiguous to each other. Accordingly, there is an advantage in that resource management is flexible.

Figure 7:
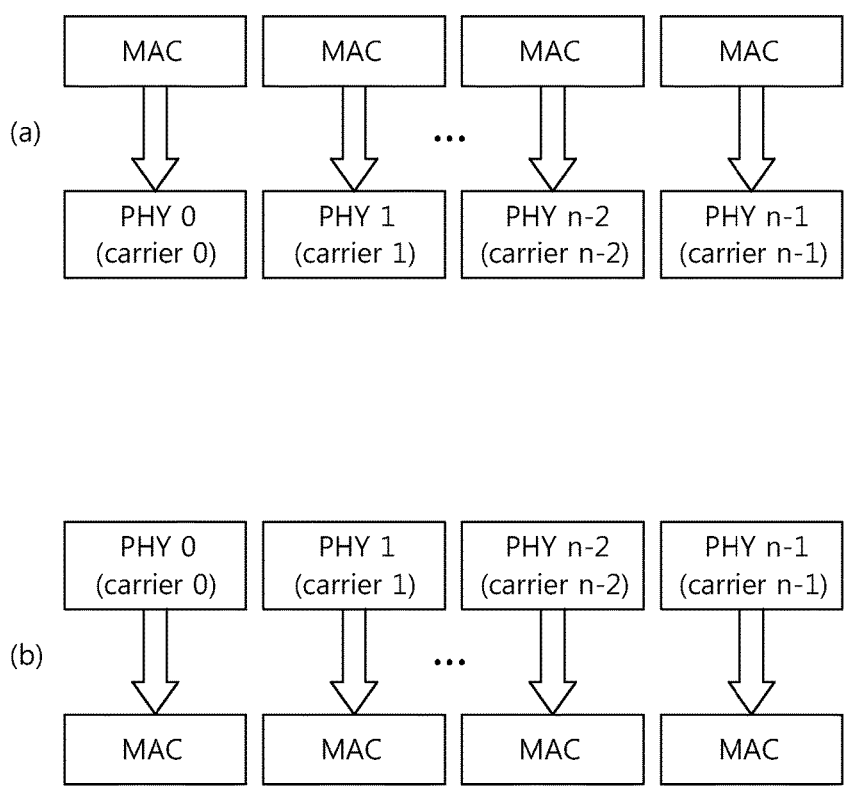
FIGS. 7 and 8 shows another example of a base station and user equipment which form a carrier aggregation system.
Figure 8:
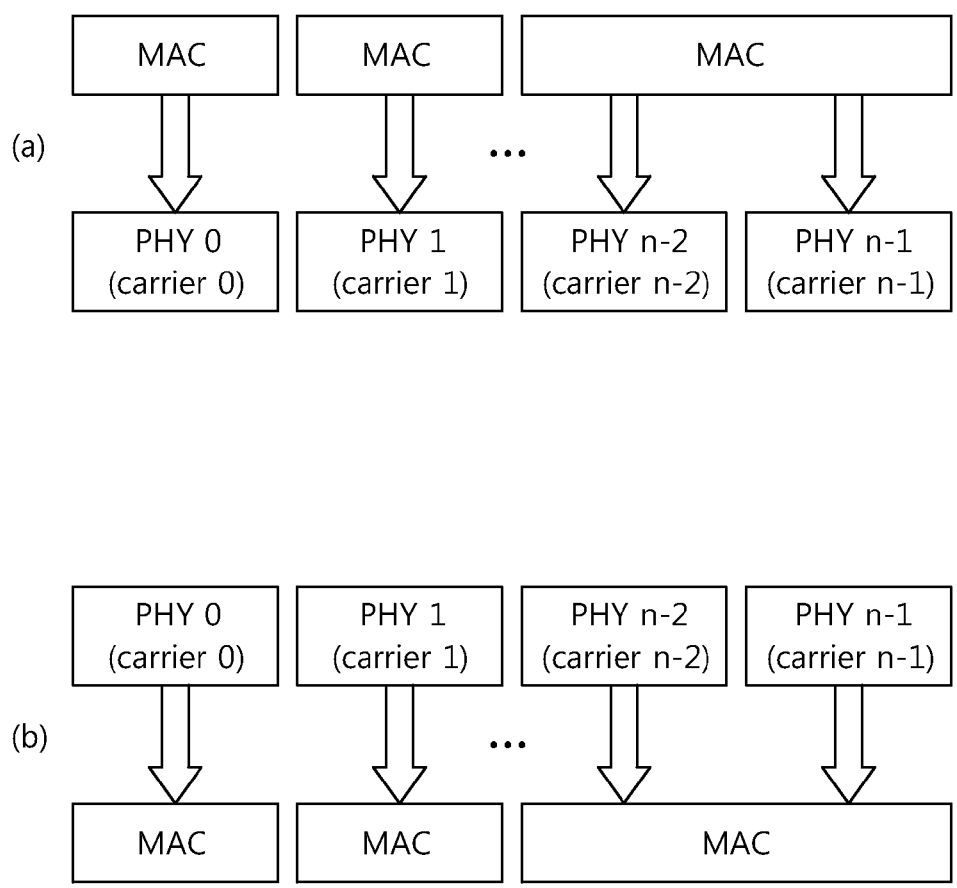

FIGS. 7 and 8 shows another example of a BS and UE which form a carrier aggregation system.

In BS of FIG. 7(a) and UE if FIG. 7(b), only one carrier is managed in one MAC. That is, MACs correspond to carrier in a one-to-one manner. In BS of FIG. 8(a) ad UE of FIG. 8(b), in some carriers, MACs correspond to carriers in a one-to-one manner, and in the remaining carriers, one MAC controls a plurality of carriers. That is, various combinations are possible according to a relationship between MACs and carriers.

Each of the carrier aggregation systems of FIGS. 6 to 8 includes n carriers, and the carriers may be contiguous to each other or may be spaced apart from each other. The carrier aggregation system may be applied to both uplink and downlink. In a TDD system, each carrier is configured to perform uplink transmission and downlink transmission. In an FDD system, a plurality of carriers may be divided and used for uplink and downlink. In a common TDD system, the number of component carriers used in uplink and downlink and the bandwidth of each of the carriers are the same. In an FDD system, an asymmetric carrier aggregation system may be configured by making different number of carriers and the bandwidth of each carrier used in uplink and the number of carriers and the bandwidth of each carrier used in downlink.

Figure 9:
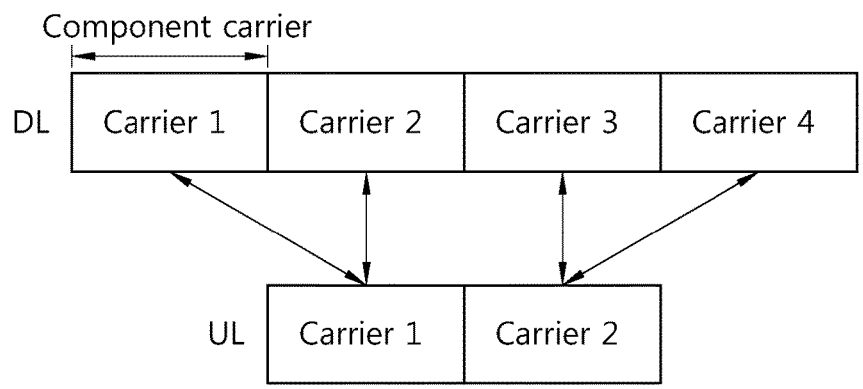
FIG. 9 shows an example of a DL/UL asymmetrical carrier aggregation system to which the present invention may be applied.
Figure 9:
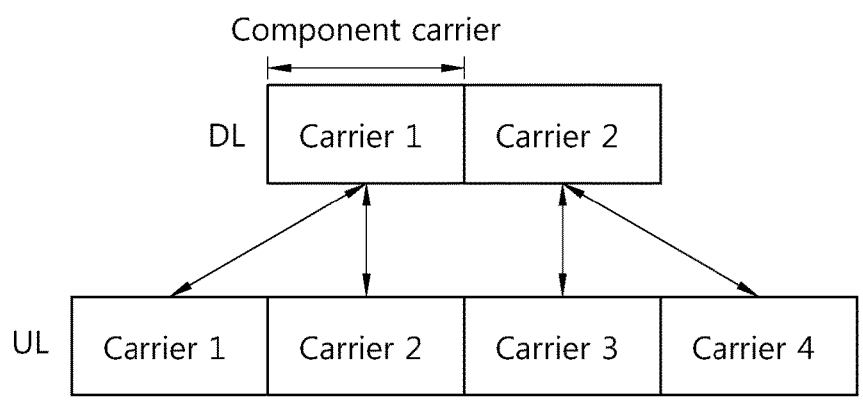

FIG. 9 shows an example of a DL/UL asymmetrical carrier aggregation system to which the present invention may be applied.

FIG. 9(a) illustrates a case where the number of DL component carriers is greater than the number of UL component carriers, and FIG. 9(b) shows a case where the number of UL component carriers is greater than the number of DL component carriers. FIG. 9(a) illustrates a case where two DL component carriers are linked to one UL component carriers, and FIG. 9(b) illustrates a case where one DL component carrier is linked to two UL component carriers. However, the number of CCs composing each of DL and UL and a ratio of DL component carriers and UL component carriers which are linked may be changed in various ways depending on a carrier aggregation system to which the present invention is applied. The contents proposed in the present invention may also be applied to a symmetric carrier aggregation system in which component carriers composing DL and component carriers composing UL are linked in a one-to-one manner.

In an LTE-A system, carriers having backward compatibility may be receivable by conventional UE, and it may function as one independent carrier or as some of a carrier aggregation by taking compatibility with the UEs of a conventional 3GPP LTE system into consideration. Carriers having backward compatibility are always configured as a pair of DL and UL in an FDD system. However, carriers not having backward compatibility are not receivable by conventional UE because they are newly defined by not taking compatibility for UEs operating in a conventional LTE system into consideration. An extension carrier may not function as one independent carrier, but may function as a set of component carriers including a carrier that may function as one independent carrier.

In a carrier aggregation system, regarding a form using one carrier or a plurality of carriers, a cell-specific or/and a UE-specific method may be taken into consideration. In describing the present invention hereinafter, the cell-specific method refers to a carrier configuration from a viewpoint of a specific cell or BS that operates the cell-specific method, and the UE-specific method refers to carrier configuration from a viewpoint of UE that operates the UE-specific method.

A cell-specific carrier aggregation may have a form of a carrier aggregation configured by a specific BS or cell. In the form of a cell-specific carrier aggregation, the linkage of DL and UL may be determined by Tx-Rx separation defined in 3GPP LTE release-8/LTE-A in case of an FDD system. For detailed contents related to the form of a cell-specific carrier aggregation, reference may be made to section 5.7 of 3GPP TS 36.101 V8.4.0 disclosed on December 2008.

A UE-specific carrier aggregation that may be used in a carrier aggregation system is described below. The UE-specific carrier aggregation is to configure a carrier set that may be used by a specific UE or a specific UE group by using a specific method (e.g., the capabilities of UE or signaling) between a BS and UE.

A UE-specific downlink component carrier (DL CC) set may be defied as a set of DL CCs that are scheduled to receive a PDSCH configured through dedicated signaling for specific UE. A UE-specific uplink component carrier (UL CC) set may be defined as a set of UL CCs scheduled to transmit a PUSCH.

In a carrier aggregation system, a PDCCH monitoring CC set refers to a set of CCs that specific UE monitors a PDCCH. The PDCCH monitoring CC set may include DL CCs that are included in a UE-specific DL CC set, or that include some of a UE-specific DL CC set or that are not included in the UE-specific DL CC set. The PDCCH monitoring CC set may be configured in a UE-specific way or in a cell-specific way.

Cross-carrier scheduling is a scheduling method capable of performing the resource allocation of a PDSCH transmitted through another CC and/or the resource allocation of a PUSCH transmitted through another CC other than CCs that are basically linked to a specific CC, through a PDCCH that is transmitted through a specific CC. That is, a PDCCH and a PDSCH may be transmitted through different DL CCs, and a PUSCH may be transmitted through other UL CCs not a UL CC linked to a DL CC on which a PDCCH including an UL grant has been transmitted.

In a system supporting cross-carrier scheduling as described above, there is a need for a carrier indicator informing that a PDSCH/PUSCH through which control information is provided by a PDCCH are transmitted through what DL CC/UL CCs. A field including the carrier indicator is hereinafter referred to as a Carrier Indication Field (CIF).

A system supporting cross-carrier scheduling may include a CIF in a conventional DCI format. In a system (e.g., an LTE-A system) supporting cross-carrier scheduling, 1 to 3 bits may be extended because the CIF is added to the existing DCI format (i.e., a DCI format used in LTE). A PDCCH structure may reuse the existing coding method, resource allocation method (i.e., CCE-based resource mapping), etc.

Non-cross-carrier scheduling may be supported even in a system supporting cross-carrier scheduling. Non-cross-carrier scheduling is a scheduling method for performing the resource allocation of a PDSCH with the same CC where a PDCCH transmitted and performing the resource allocation of a PUSCH transmitted through one CC linked to a specific CC with the specific CC. In non-cross-carrier scheduling, a CIF may not be included. That is, the existing PDCCH structure and DCI format may be reused.

A BS may semi-statically configure whether cross-carrier scheduling has bee activated. That is, a BS may semi-statically configure whether the CIF is included in the DCI format and may configure whether the CIF is included in the DCI format in a UE (or UE group)-specific way or a cell-specific way. Signaling overhead between a BS and UE can be reduced through the semi-static configuration.

As described above, in the carrier aggregation system, a plurality of DL CCs and a plurality of UL CCs may exist. In this case, a method of configuring or allocating an index through which a UL CC may be identified (i.e., a method of indexing the UL CC) is problematic.

First, a field indicating the index of a UL CC (i.e., a method of configuring a CIF) is described. The configuration of a DL CIF indicating the index of a DL CC may be likewise used as the configuration of a UL CIF indicating the index of the UL CC. That is, the bit size of the UL CIF may be configured to be identical with the bit size of the DL CIF. The method of indexing the DL CIF may become the same as the method of indexing the UL CIF through linkage between the UL CC and the DL CC. If the size of a UL CC set is smaller than the size of a DL CC set, the same configuration as that of the DL CIF is used, but remaining bits may not be used.

If the size of the UL CC set is different from the size of the DL CC set, a bit size and an indexing method different from those of the DL CIF may be necessary for the UL CIF. For example, the configuration of the UL CIF may use any one of the following methods.

1. The UL CIF can have the same bit size of the DL CIF, but the indexing method may be different.

2. The UL CIF can have different bit size with the DL CIF, and can have different indexing method. For example, the UL CIF may have a smaller bit size than the DL CIF. This method may be applied when the number of UL CCs include in the UL CC set is smaller than the number of DL CCs include in the DL CC set.

A DCI format for downlink resource allocation for LTE-A may have a configuration in which a CIF of n bits is added to the DCI format of the existing LTE Rel-8. The DCI format 0 or the DCI format 1A of LTE-A may have the same size as the DCI format 0 and the DCI format 1A of LTE Rel-8. Accordingly, the number of times of blind decoding by UE can be reduced. In case of an LTE-A DCI format 0 having an extended form in LTE Rel-8, although the number of bits necessary to index UL CCs within a UL CC set is small, the size of the CIF field may have the same n bits as the CIF field attached to another DCI in order to reduce the number of times of blind decoding. Here, the remaining bits or $\log_2 (M)$ (where M indicates the number of cases representing additional information) other than parts actually used, from among CIF bits (n bits) for a UL CC, may be used for other purposes. For example, if 1 bit remains in the n bits, the 1 bit may be used for the following purposes.

1. The 1 bit may indicate whether DCI is for uplink or for downlink. That is, the 1 bit may be used as an indicator indicating to distinguish UL DCI and DL DCI from each other.

2. The 1 bit indicates whether a CC has been activated

The 1 bit may be used to indicate whether a UL CC has been activated/deactivated. If plural bits remain in the n bits, the plurality of bits may be used to indicate whether a UL CC has been activated/deactivated and to represent the state of other CCs. For example, the plurality of bits may be used to indicate whether a CC is in an idle state, a sleep mode, or a hibernation state.

3. The 1 bit may be use as the CQI feedback indicator of another CC or as an aperiodic PUSCH trigger.

4. The 1 bit may be used as an additional DCI format indicator. For example, the 1 bit may be used as the discriminator of a DCI format having the same length, such as an indicator for distinguishing DCI 0 and DCI 1A of LTE Rel-8 from each other. Accordingly, the number of times of blind decoding by UE can be reduced.

5. The 1 bit may be used to indicate a single antenna port mode for a dynamic uplink transmission mode.

6. The 1 bit may be used as a DM-RS parameter or an MU-MIMO orthogonal cover code indicator. In LTE-A, a field indicating that the dimension of uplink orthogonal resources has been increased may be further necessary. Here, the remaining bit may be used.

7. clustered mode indicator.

8. PHICH mapper correction item

9. IFDMA RS indicator (e.g., a comb index or an RS-type indicator)

It is hereinafter assumed that a CIF is configured in a UE-specific way and the CIF has a fixed bit size of 3 bits when the CIF is included. It is also assumed that, if a CIF is included, the CIF has a fixed position irrespectively of a DCI format size. A method of indexing UL CCs is described below.

The method of indexing UL CCs may be divided into a method of indexing UL CCs while allowing the UL CCs to overlap with the indices of DL CCs and a method of exclusively indexing UL CCs so that the UL CCs do not overlap with the indices of DL CCs by taking the indices of DL CCs into consideration.

Figure 10:
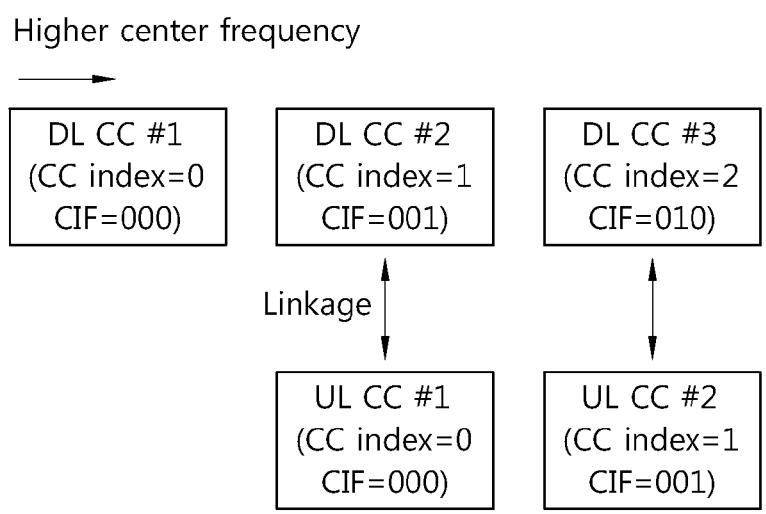
FIG. 10 shows a first example of a UL CC indexing method.

FIG. 10 shows a first example of a UL CC indexing method.

Referring to FIG. 10, a UL CC#1 is linked to a DL CC#2, and a UL CC#2 is linked to a DL CC#3. In this case, a DL CC#1 to the DL CC#3 are sequentially assigned CC indices from 0 to 2. The CC index 0 is assigned to the UL CC#1, and the CC index 1 is assigned to the UL CC#2. That is, a DL CC and a UL CC are independently assigned indices. In this case, the index of the UL CC may overlap with the index of the DL CC.

Figure 11:
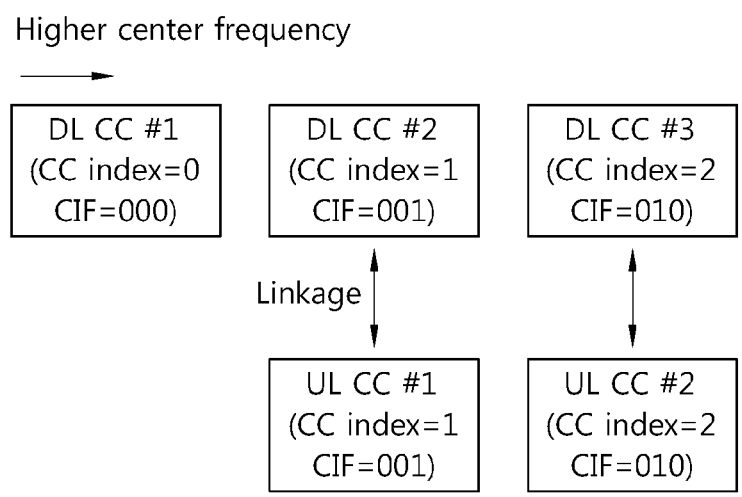
FIG. 11 shows a second example of a UL CC indexing method.

FIG. 11 shows a second example of a UL CC indexing method.

Referring to FIG. 11, a UL CC#1 is linked to a DL CC#2, and a UL CC#2 is linked to a DL CC#3. A DL CC#1 to the DL CC#3 are sequentially assigned CC indices from 0 to 2. The CC index 1 is assigned to the UL CC#1, and the CC index 2 is assigned to the UL CC#2. That is, the index of a UL CC may have the same index as the index of a DL CC linked thereto. In this case, the index of the UL CC may overlap with the index of the DL CC.

Figure 12:
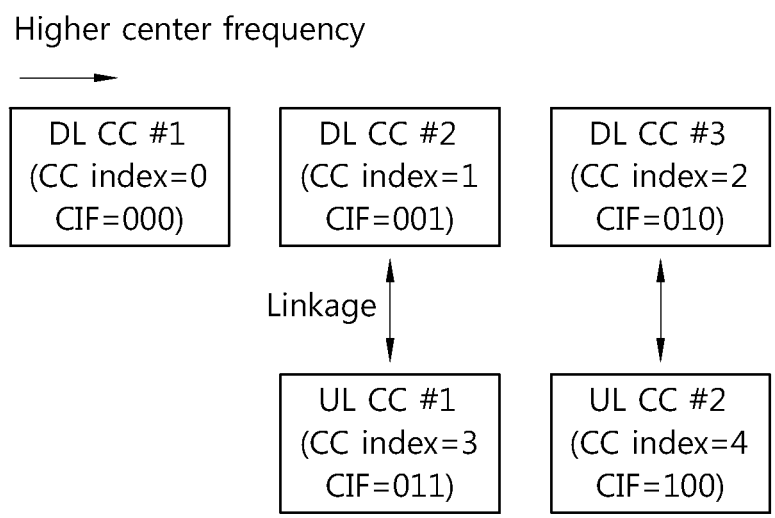
FIG. 12 shows a third example of a UL CC indexing method.

FIG. 12 shows a third example of a UL CC indexing method.

Referring to FIG. 12, a UL CC#1 is linked to a DL CC#2, and a UL CC#2 is linked to a DL CC#3. A DL CC#1 to the DL CC#3 are sequentially assigned CC indices from 0 to 2. A CC index 3 is assigned to the UL CC#1, and a CC index 4 is assigned to the UL CC#2. Since the DL CCs have values of the CC indices from 0 to 2, the UL CCs are assigned starting from the CC index 3. That is, the index of the UL CC is set to a unique value by taking the indices of DL CCs into consideration. Accordingly, the index of a UL CC may be indexed so that it has a value not overlapping with the index of a DL CC.

If the index of a UL CC is allowed to overlap with the index of a DL CC as in the first example and the second example (i.e., if the UL CC and the DL CC are assigned an index having the same value), there is a problem in that UE is unable to know whether a carrier indicated by a CIF is a UL CC or a DL CC. Accordingly, when UE receives DCI through a PDCCH, it is necessary to indicate whether the DCI is for a DL CC or a UL CC through a field other than a CIF. Since a flag field for DL/UL classification is included within the DCI formats 0 and 1A, there is no problem although a UL CC/DL CC indexing method, such as that of the first example and the second example, is used. If a flag field for DL/UL classification cannot be used (e.g., if the flag field for DL/UL classification has to be used for other purposes), whether the DCI of a PDCCH is for a DL CC or for a UL CC must be indicated by using only a CIF. In this case, it is preferred that a third example in which the indices of a DL CC and a UL CC are exclusively assigned be used.

If the first example to the third example are used, a method of assigning the index of a UL CC may include an explicit method and an implicit method. The explicit method is a method of a BS informing UE of the index values of UL CCs within a UE-specific CC set, assigned to the UE, through a high layer signal, such as an RRC signal. The implicit method is a method of a BS informing UE of the indices of UL CCs within a UE-specific or cell-specific CC set, assigned to the UE, 1) in frequency ascending/descending order or 2) through linkage with a DL CC. The methods 1) and 2) are described later.

The indexing of DL CCs/UL CCs implicitly configured may be dynamically configured. The indexing of DL CCs/UL CCs may be changed on the basis of a DL CC on which a PDCCH has been received in a UE-specific way is transmitted. In this case, UE may perform the indexing of DL CCs/UL CCs in frequency ascending or descending order on the basis of the DL CC on which the PDCCH has been received.

In the case where whether a CIF is included is configured for every CC, if a specific CC is configured so that it can include a CIF, the CIF may be attached to DCI and a grant message may be then transmitted to UE in order to reduce the number of times of blind decoding by the UE even in case of non-cross-carrier scheduling.

A. A method of indexing UL CCs according to the present invention when the index of a UL CC is allowed to overlap with the index of DL CC is now described.

1. An Indexing Method in Frequency Ascending/Descending Order

1) In Case of Dynamic Indexing

Figure 13:
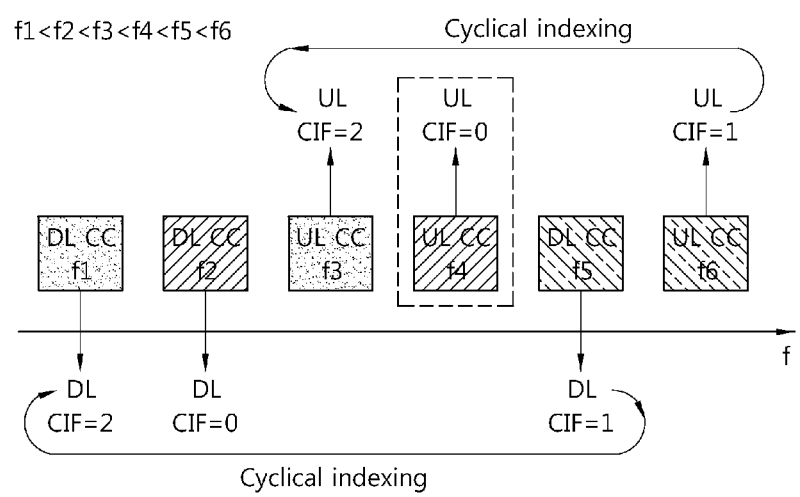
FIG. 13 shows an example of a method of indexing UL CCs in frequency-ascending order in case of dynamic indexing.
Figure 13:

FIG. 13 shows an example of the method of indexing UL CCs in frequency-ascending order in case of dynamic indexing.

Referring to FIG. 13, the index of a DL CC has any one of {0, 1, 2}, and the index of a UL CC has any one of {0, 1, 2}. That is, the index of the UL CC may overlap with the index of the DL CC.

Hereinafter, a DL CC fn indicates a DL CC having the center frequency of fn and a UL CC fm indicates a UL CC having the center frequency of fm (each of n and m is 0 or a natural number), for convenience sake. For example, it is assumed that a DL CC f1 is linked to a UL CC f3, a DL CC f2 is linked to a UL CC f4, and a DL CC f5 is linked to a UL CC f6. In this case, if the DL CC f2 is a DL CC on which a PDCCH is transmitted, the index of the DL CC f2 may be assigned a reference value (for example, '0'). Furthermore, the index of the UL CC f4 linked to the DL CC f2 may be assigned '0'. UL CCs having a greater center frequency on the basis of the UL CC f4 are assigned indices in ascending order. Furthermore, posterior to a UL CC (UL CC f6) having the highest center frequency, a next index is assigned to a UL CC (UL CC f3) having the lowest center frequency. UL CCs are assigned indices in ascending order from the UL CC having the lowest center frequency toward the direction of UL CCs having a higher center frequency. A method in which the indices of UL CCs are assigned in frequency-ascending order and the indices of UL CCs are then cyclically assigned as described above is called frequency ascending-order indexing.

Frequency descending-order indexing may be likewise performed. That is, after the index value of '0' is assigned to the UL CC f4 linked to the DL CC f2, UL CCs placed in the direction of a lower frequency are sequentially assigned indices. Furthermore, after an index is assigned to the UL CC having the lowest center frequency, the UL CC having the highest center frequency is cyclically assigned an index. The UL CCs are assigned indices again from the UL CC having the highest center frequency toward the direction of the UL CC having the reference value. This method is called frequency descending-order indexing.

In the above example, a link between the DL CC and the UL CC may comply with linkage configured in Rel-8 or may comply with linkage configured by RRC signaling.

2) In Case of Semi-Static Indexing

Figure 14:
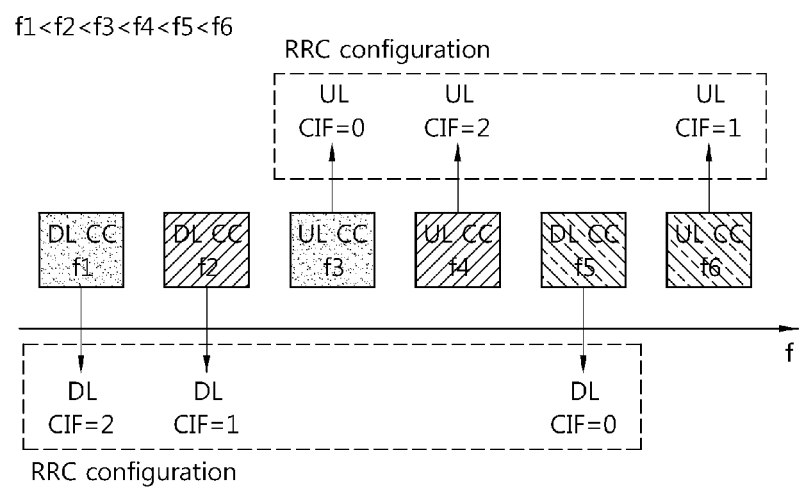
FIG. 14 shows an example of a method of indexing UL CCs in a semi-static way.

FIG. 14 shows an example of a method of indexing UL CCs in a semi-static way.

Referring to FIG. 14, the indices of a UL CC and a DL CC may be determined by RRC signaling. In this case, the indices of the DL CC and the UL CC need not to be necessarily the same. For example, a DL CC f1 (CIF=2) and a UL CC f3 (CIF=0) that are linked may have different indices.

A DL CC and a UL CC may be assigned indices again after a preset period or after RRC signaling informing new DL CC/UL CC indexing. In this case, in order to reconfigure the indices, at least one of DL CCs must maintain connection with a BS, and the index (i.e., a CIF) of the DL CC may be set to have a constant value after or before the reconfiguration.

Furthermore, in order to reconfigure the indices, at least one UL CC must maintain connection with a BS, and the index (i.e., a CIF) of the UL CC may be set to have a constant value after or before the reconfiguration.

A DL CC and a UL CC for a reconfiguration may be specific CCs not having linkage, but it is preferred that they are a DL CC and a UL CC linked through DL CC-UL CC pairing. For example, if a DL CC f5 (CIF=0) is a DL CC for a reconfiguration, a UL CC f6 (CIF=1) may become a UL CC for a reconfiguration. This is only illustrative.

2. A Method Using Linkage with a DL CC

1) In Case of Dynamic Indexing

Figure 15:
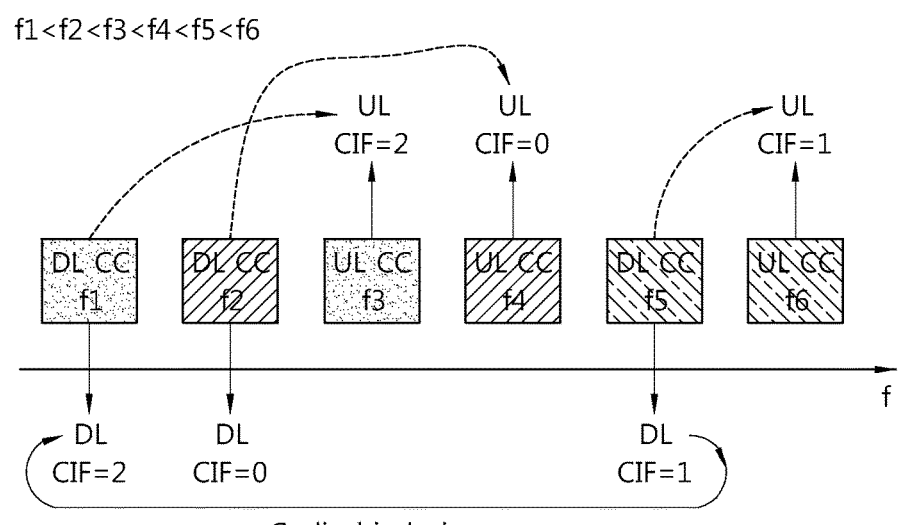
FIG. 15 shows an example of a method of indexing UL CCs by using linkage with a DL CC in case of dynamic indexing.

FIG. 15 shows an example of a method of indexing UL CCs by using linkage with a DL CC in case of dynamic indexing.

Referring to FIG. 15, the index of a UL CC may be determined depending on linkage with a DL CC. For example, the index of a UL CC may have the same value (CIF value) as the index of a DL CC linked thereto. That is, if the CIF value of a DL CC f1 is 2, the CIF value of a UL CC f3 linked to the DL CC f1 may be also assigned 2.

If the indexing of DL CCs are dynamic indexing, the indexing of UL CCs may also be dynamically changed. In this case, a primary DL CC on which a PDCCH is transmitted may have the permanent CIF value. Furthermore, a UL CC linked to the primary DL CC may have the permanent CIF value.

Figure 16:
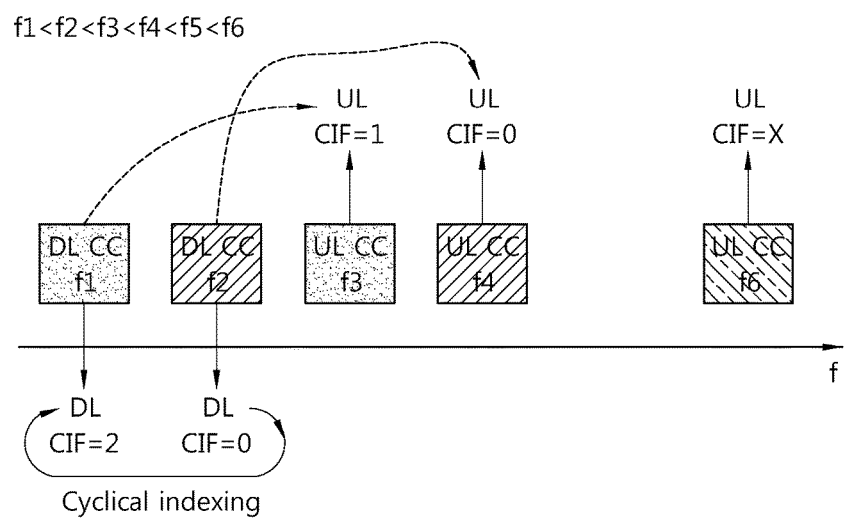
FIG. 16 shows a method of indexing UL CCs in case of asymmetrical DL CC/UL CC linkage where a link does not exist.

FIG. 16 shows a method of indexing UL CCs in case of asymmetrical DL CC/UL CC linkage where a link does not exist.

Referring to FIG. 16, a UL CC f6 does not have a link with a DL CC. In this case, the UL CC f6 may use a value preset as a CIF value. That is, if some DL CCs/UL CCs (i.e., they have an asymmetrical DL CC/UL CC relationship) does not exist, a relevant UL CC may be assigned a CIF value predetermined through an RRC signal.

Figure 17:
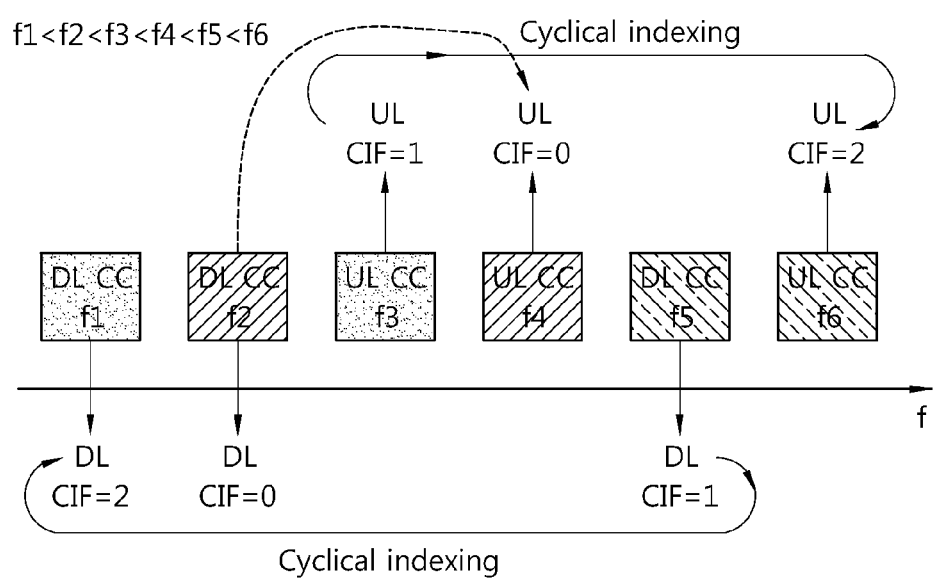
FIG. 17 shows another example of a method of indexing UL CCs by using linkage with a DL CC in case of dynamic indexing.

FIG. 17 shows another example of the method of indexing UL CCs by using linkage with a DL CC in case of dynamic indexing.

Referring to FIG. 17, a UL CC f4 is linked to a DL CC f2 on which a PDCCH is transmitted. Accordingly, the UL CC f4 has a CIF value of '0' like the DL CC f2. The remaining UL CCs other than the UL CC f4 may be assigned indices according to individual indexing methods. For example, the remaining UL CCs other than the UL CC f4 may be assigned indices in frequency descending order on the basis of the UL CC f4. That is to say, the CIF value of only a specific UL CC is determined by using linkage with a DL CC, and the CIF values of the remaining UL CCs may be determined using additional methods.

2) In Case of Semi-Static Indexing

Figure 18:
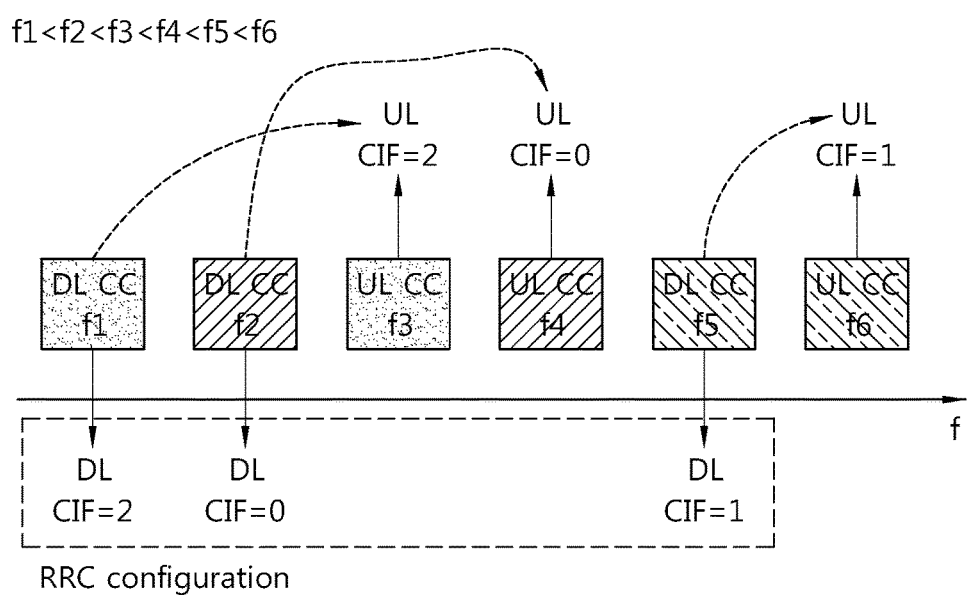
FIG. 18 shows an example of a method of indexing UL CCs in case of semi-static indexing.
Figure 18:

FIG. 18 shows an example of a method of indexing UL CCs in case of semi-static indexing.

Referring to FIG. 18, the indices of DL CCs are configured through a high layer signal, such as RRC. For example, a DL CC f1 may be set as a CIF=2, a DL CC f2 may be set as a CIF=0, and a DL CC f5 may be set as a CIF=1. In this case, the index of a UL CC may be likewise determined based on linkage with the DL CCs. That is to say, the CIF of a UL CC f3 linked to the DL CC f1 is determined as 2, the CIF of a UL CC f4 linked to the DL CC f2 is determined as 0, and the CIF of a UL CC f6 linked to the DL CC f5 is determined as 1.

In this case, in order to reconfigure the CIF value of each of the CCs, at least one DL CC must maintain a link with a BS, and the CIF value of the at least one DL CC may be assigned a constant value before and after a reconfiguration. Likewise, in order to reconfigure a CIF, at least one UL CC must maintain a link with a BS, and the CIF of the at least one UL CC may be assigned a constant value before and after a reconfiguration.

Figure 19:
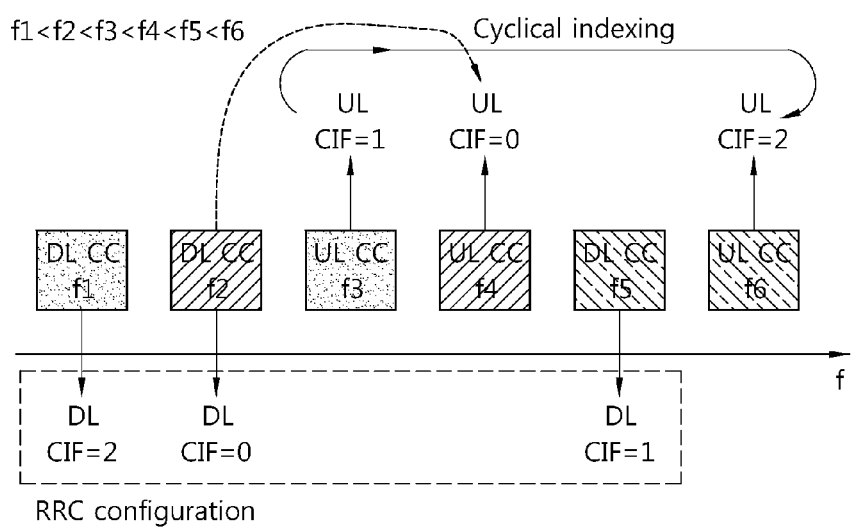
FIG. 19 shows another example of a method of indexing UL CCs in case of semi-static indexing.

FIG. 19 shows another example of the method of indexing UL CCs in case of semi-static indexing.

Referring to FIG. 19, the indices of DL CCs are set through a high layer signal, such as RRC. Furthermore, the CIF values of some of UL CCs may be determined based on linkage with a DL CC, and the CIF values of the remaining UL CCs may be determined by a separate indexing method. For example, if a UL CC f4 has a link with a primary DL CC f2 on which a PDCCH is transmitted, the UL CC f4 is set to have the same CIF value '0' as the DL CC f2. Furthermore, the CIF values of the remaining UL CCs (i.e., a UL CC f3 and a UL CC f6) are set using a frequency descending-order method. That is to say, the CIF value of the UL CC f3 is set to 1, and the UL CC f6 having the highest center frequency is cyclically set to a CIF=2 because there is no a UL CC having a lower center frequency.

In the semi-static UL CC indexing methods described with reference to FIGS. 18 and 19, a condition that a DL CC and a UL CC are reversed may be taken into consideration. That is to say, the index of the UL CC may be set through RRC, and the index of the DL CC may be determined based on linkage. The same principle may apply to the asymmetrical condition of the UL CC and the DL CC.

B. A method of indexing UL CCs according to the present invention when the index of a UL CC is not allowed to overlap with the index of a DL CC is described below.

1. An Indexing Method in Frequency Ascending/Descending Order

1) In Case of Dynamic Indexing

A method of exclusively assigning the index of a DL CC and the index of a UL CC means that the index of the UL CC is set to a distinguishable value by taking the DL CC and the UL CC into consideration at the same time.

Figure 20:
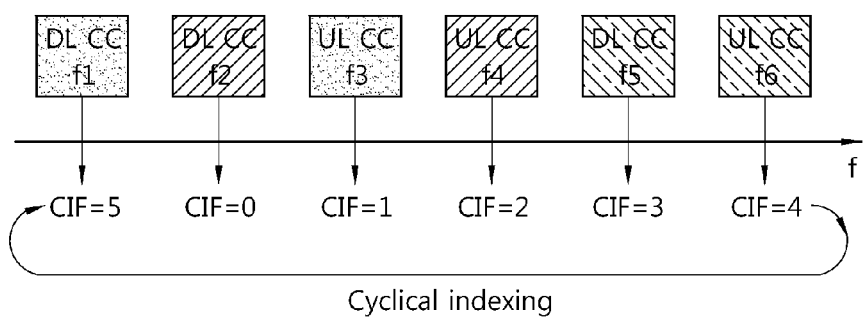
FIG. 20 shows an example of exclusive UL CC indexing in case of dynamic indexing.
Figure 20:
Figure 20:
Figure 20:

FIG. 20 shows an example of exclusive UL CC indexing in case of dynamic indexing.

Referring to FIG. 20, it is assumed that a primary DL CC on which a PDCCH is transmitted is a DL CC f2. In this case, DL CCs and UL CCs may be assigned indices in frequency-ascending order on the basis of the DL CC f2. That is, the CIF of the DL CC f2 is set to a specific value (e.g., a CIF=0) (i.e., a reference), the CIF of a UL CC f3 is set to 1, the CIF of a UL CC f4 is set to 2, the CIF of a DL CC f5 is set to 3, and the CIF of a UL CC f6 is set to 4. Furthermore, the CIF of a DL CC f1 having the lowest center frequency is cyclically set to 5.

FIG. 20 shows the frequency ascending-order indexing method, but a frequency descending-order indexing method is also possible. That is to say, CIF values may be sequentially assigned to DL CCs or UL CCs placed in the direction of a lower frequency on the basis of the primary DL CC, and a CC having the highest center frequency may be cyclically assigned an index after a CC having the lowest center frequency.

2) In Case of Semi-Static Indexing

Figure 21:
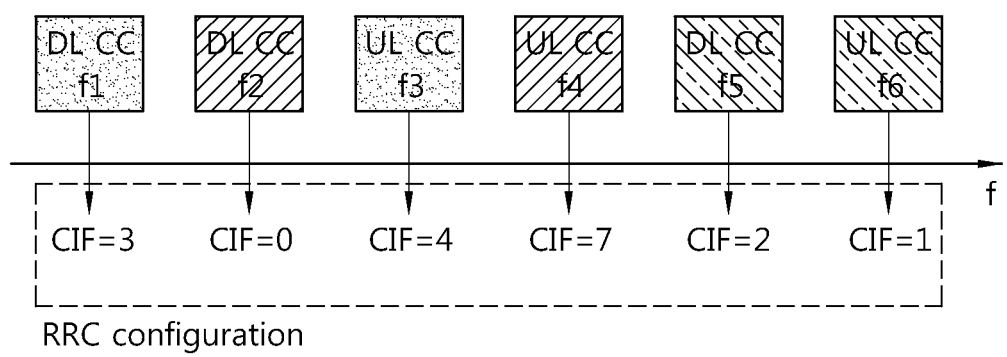
FIG. 21 shows an example of UL indexing in case of semi-static indexing.
Figure 21:
Figure 21:
Figure 21:

FIG. 21 shows an example of UL indexing in case of semi-static indexing.

Referring to FIG. 21, a BS may semi-statically assign the CIF values (i.e., indices) of DL CCs and UL CCs through a high layer signal, such as RRC. In this case, the CIF values may be randomly assigned to the respective CCs. If the CIF values of the CCs are to be reset, at least one of the DL CC must maintain a link with a BS in order to reconfigure a CIF, and the CIF of the DL CC may be assigned a constant value before and after a reconfiguration. That is, the DL CC may be set to have the same CIF value as that before a reconfiguration even after the CIF is reset. Furthermore, at least one of UL CCs must maintain a link with a BS in order to reconfigure a CIF, and the CIF of the DL CC may be assigned a constant value before and after a reconfiguration.

For example, the CIF value of a DL CC for a CIF reconfiguration may be assigned a minimum value, and the CIF value of a UL CC for a CIF reconfiguration may be assigned a maximum value. In the example of FIG. 21, the CIF value of the DL CC for a CIF reconfiguration may be assigned '0', and the CIF value of a UL CC for a CIF reconfiguration may be assigned '7'.

A DL CC and a UL CC for a CIF reconfiguration may be configured as specific CCs not linked, but it is advantageous to configure the DL CC and the UL CC for a CIF reconfiguration which have linkage in order to transmit and receive an already defined control channel. That is, in the example of FIG. 21, a DL CC f2 and a UL CC f4 are CCs having linkage, and this DL CC/UL CC pair may be used as a CIF reconfiguration CC.

2. Method Using Linkage with a DL CC

A method of indexing UL CCs using linkage between a UL CC and a DL CC when the indices of the UL CC and the DL CC are exclusively assigned is described below.

1) In Case of Dynamic Indexing

Figure 22:
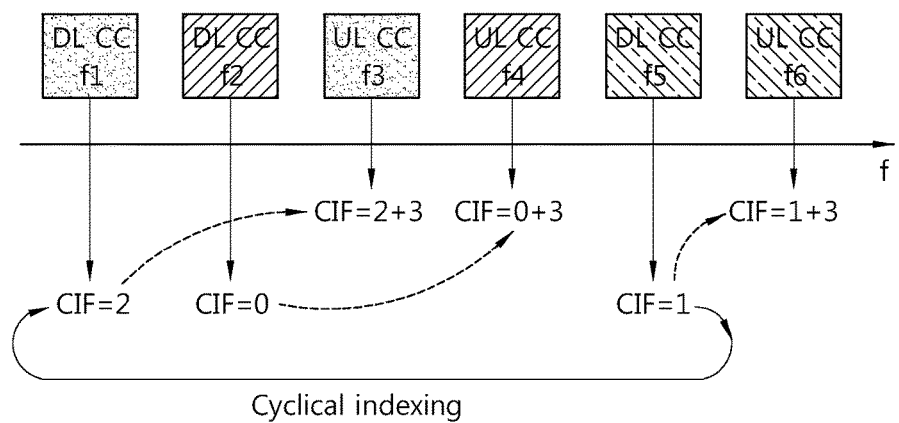
FIG. 22 shows an example in which UL CCs are dynamically indexed.

FIG. 22 shows an example in which UL CCs are dynamically indexed.

Referring to FIG. 22, the index of a UL CC may be dynamically changed based on the index of a primary DL CC that is dynamically assigned. For example, it is assumed that a DL CC f1 and a UL CC f3 are linked, a DL CC f2 and a UL CC f4 are linked, and a DL CC f5 and a UL CC f6 are linked. In this case, if a primary DL CC on which a PDCCH is transmitted is the DL CC f2, an offset value as a CIF value may be added to the UL CC f4 linked to the DL CC f2. Here, the offset value may be a value where the indices of DL CCs do not overlap with the indices of UL CCs. For example, if the indices of DL CCs are assigned in frequency-ascending order, an offset value may be given as a value, such as the number of DL CCs. Each of UL CCs linked to the remaining DL CCs other than the DL CC f2 may have a CIF value in which the offset value is added to the CIF value of a DL CC.

Figure 23:
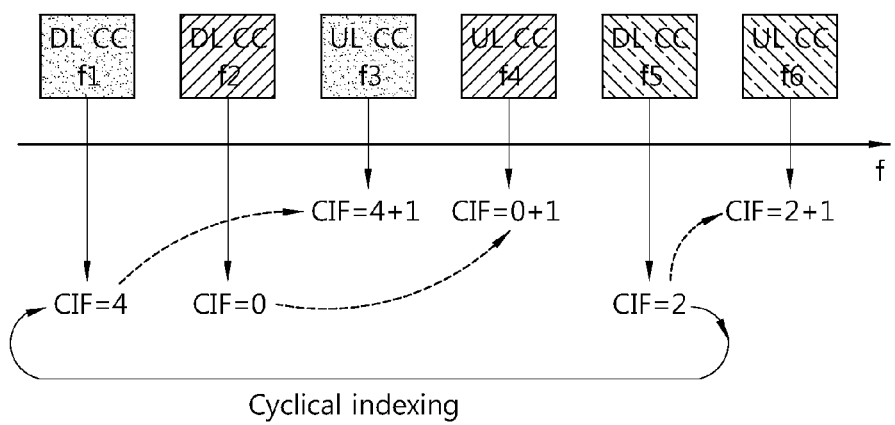
FIG. 23 shows another example in which UL CCs are dynamically indexed.
Figure 23:
Figure 23:
Figure 23:

FIG. 23 shows another example in which UL CCs are dynamically indexed.

Referring to FIG. 23, the index of a UL CC may be configured to have a form in which '1' is added to the index of a DL CC. In this case, however, the indices of DL CCs must be assigned with a difference of '2'. For example, a DL CC f2 may be assigned a CIF=0, a DL CC f5 may be assigned a CIF=2, and a DL CC f1 may be assigned a CIF=4. Thus, a UL CC f4 linked to the DL CC f2 has a CIF=1, a UL CC f6 linked to the DL CC f5 has a CIF=3, and a UL CC f3 linked to the DL CC f1 has a CIF=5. In FIG. 23, a case where '1' is added to the index of a DL CC has been illustrated, but not limited thereto. A specific value may be subtracted, such as adding '−1'.

Figure 24:
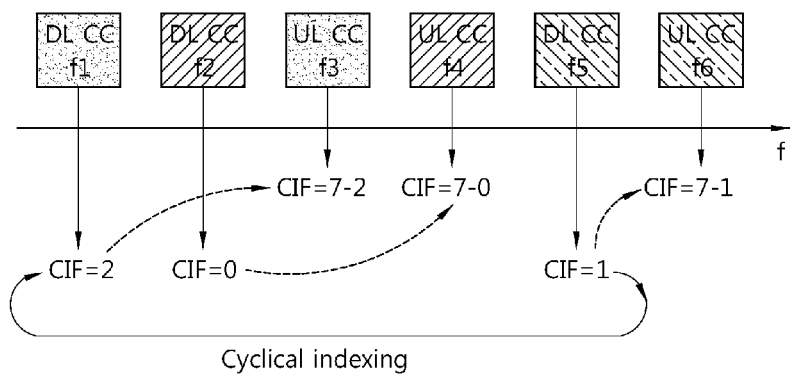
FIG. 24 shows yet another example in which UL CCs are dynamically indexed.

FIG. 24 shows yet another example in which UL CCs are dynamically indexed.

Referring to FIG. 24, the indices of UL CCs are assigned in such a way as to subtract the index of a DL CC, linked to a UL CC, from a maximum value of an index that may be assigned to the UL CC. For example, if a CIF has 3 bits, a maximum value of an index that may be assigned to a UL CC may be 7. In this case, the index of a UL CC f4 linked to a DL CC f2 (CIF=0) is assigned 7−0=7. The index of a UL CC f6 linked to a DL CC f5 (CIF=1) is assigned 7−1=6. The index of a UL CC f3 linked to a DL CC f1 (CIF=2) is assigned 7−2=5.

Figure 25:
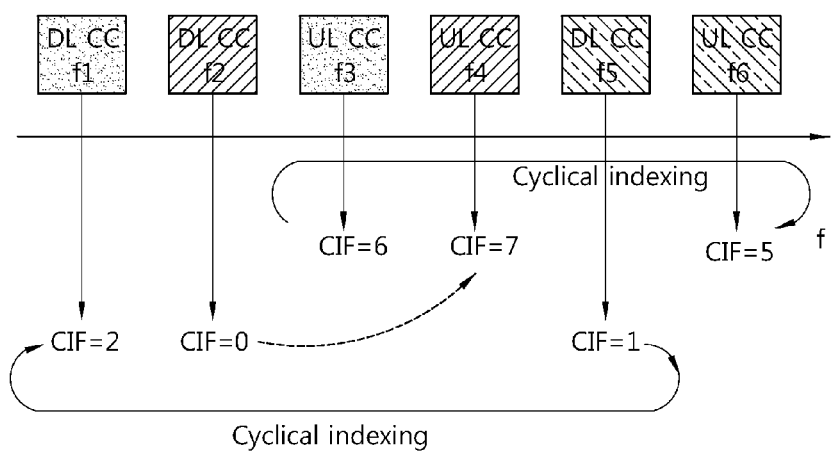
FIG. 25 shows further yet another example in which UL CCs are dynamically indexed.

FIG. 25 shows further yet another example in which UL CCs are dynamically indexed.

Referring to FIG. 25, the index of a specific UL CC is determined by the index of a DL CC linked thereto, and the indices of the remaining UL CCs are determined using individual methods between the UL CCs. In this case, the index of the specific UL CC may have a value by taking indices that may be assigned to DL CCs into consideration so that the indices of UL CCs do not overlap with the indices of the DL CCs. For example, assuming that a primary DL CC is a DL CC f2 (CIF=0), the index of a UL CC f4 linked to a DL CC f2 may be set to a maximum value (7 if a CIF has 3 bits) that may be assigned to CCs. The remaining UL CCs other than the UL CC f4 may be indexed using individual methods (e.g., in frequency descending-order).

2) In Case of Semi-Static Indexing

The methods of dynamically indexing UL CCs, described with reference to FIGS. 22 to 25, may also be likewise applied to a method of semi-statically indexing UL CCs. However, the methods of dynamically indexing UL CCs differ from a method of semi-statically indexing UL CCs in that the indices of DL CCs are signaled through a high layer signal, such as RRC, and are semi-statically configured.

C. A method of indexing UL CCs, wherein the redundancy of indices is permitted for only a primary DL CC on which a PDCCH is transmitted and a UL CC linked to the primary DL CC, is described below.

Figure 26:
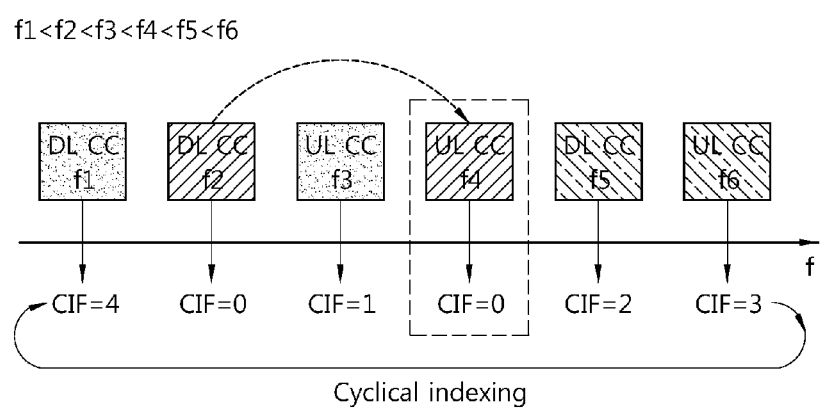
FIGS. 26 and 27 show examples of a UL CC indexing method.
Figure 26:
Figure 26:
Figure 26:
Figure 27:
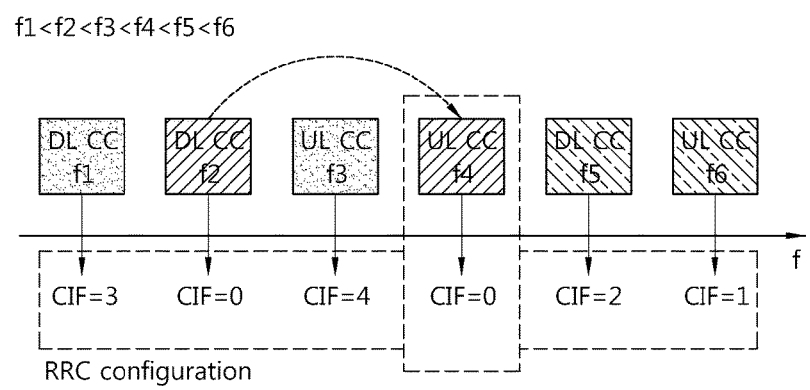

FIGS. 26 and 27 show examples of a UL CC indexing method.

Referring to FIG. 26, the index of a UL CC linked to a specific DL CC (e.g., a primary DL CC) has the same value as the index of the specific DL CC. Furthermore, the remaining UL CCs and DL CCs may be indexed in frequency-ascending order. It is evident that the remaining UL CCs and the DL CCs may be indexed using the above-described methods.

FIG. 27 is the same as FIG. 26 in that the index of a UL CC linked to a specific DL CC (e.g., a primary DL CC) has the same value as the index of the specific DL CC, but differs from FIG. 26 in that the indices of the remaining DL CCs and UL CCs are semi-statically set through RRC. If a DL CC having a CIF=0 is a DL CC on which a PDCCH is transmitted or a CC that performs the reconfiguration of a CC through RRC setting, it is not necessary to individually set the index of a UL CC linked thereto because cross-carrier scheduling is not required. Accordingly, there is an advantage in that the state of a CIF is reduced.

The ambiguity of DCI in cross-carrier scheduling and a UL CC/DL CC indexing method for solving the ambiguity are described below.

First, the ambiguity of DCI in cross-carrier scheduling is described.

If cross-carrier scheduling has not been not activated in a carrier aggregation system, it means that a PDCCH monitoring CC set is always identical with a UE-specific DL CC set. In this case, it is not necessary to indicate the PDCCH monitoring CC set through additional signaling. If cross-carrier scheduling has been activated, a PDCCH monitoring CC set must be defined within a UE-specific DL CC set. Accordingly, in this case, additional signaling may be necessary for the PDCCH monitoring CC set.

FIGS. 28(a) and 28(b) show methods of linking DL CCs included in a PDCCH monitoring CC set and CCs on which PDSCHs/PUSCHs are transmitted.

[Method 1]

Referring to FIG. 28(a), the method 1 is a method in which each of CCs on which a PDSCH/PUSCH are transmitted (hereinafter referred to as a PDSCH/PUSCH CC) is scheduled through one DL CC. That is, UE has only to monitor only one DL CC for the PDSCH/PUSCH CC. The UE monitors a PDCCH to which a CIF is attached in one DL CC and which is transmitted. The PDCCH of the DL CC may schedule at least one of a PDSCH for the same DL CC and/or the PUSCH of a UL CC linked to the DL CC. Furthermore, the PDCCH of the DL CC may schedule at least one of a PDSCH transmitted in another DL CC not the same DL CC and/or the PUSCH of a UL CC linked thereto by using a CIF. However, a PDCCH for the DL CC on which the PDSCH is transmitted and/or the UL CC on which the PUSCH is transmitted may be detected only in a predetermined DL CC.

[Method 2]

Figure 28:
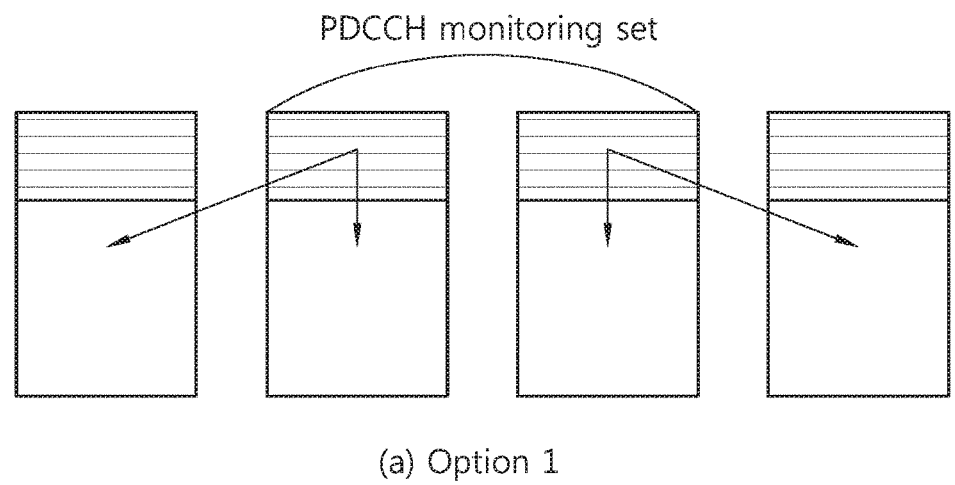
FIGS. 28(a) and 28(b) show methods of linking DL CCs included in a PDCCH monitoring CC set and CCs on which PDSCHs/PUSCHs are transmitted.
Figure 28:
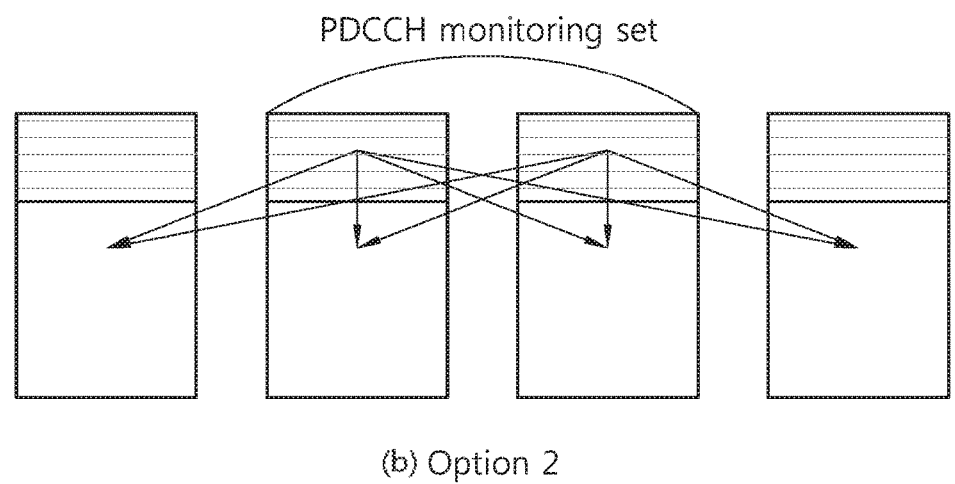

Referring to FIG. 28 (b), the method 2 is a method of scheduling a PDSCH/PUSCH CC through one or more DL CCs. The PDSCH/PUSCH CC is scheduled only through one DL CC in each subframe, but may be scheduled through different DL CCs in different subframes. That is, a PDSCH transmitted in a specific DL CC may be scheduled by a PDCCH transmitted in a specific DL CC #A in the relevant subframe and may be scheduled by a PDCCH transmitted in another DL CC #B. In a DL CC that UE monitors a PDCCH including a CIF, the PDCCH may schedule at least one of the PDSCH of the same DL CC and/or the PUSCH of a linked UL CC.

The method 1 does not increase the number of times of blind decoding of a PDCCH and/or the false detection rate of the PDCCH as compared with a system not having a CIF.

If it is assumed that UE attempts blind decoding 12 times in the Common Search Space (CSS) of each CC, the maximum number of times of blind decoding attempts at each CC in non-cross-carrier scheduling is 44. Furthermore, the maximum number of times of blind decoding attempts at each CC in cross-carrier scheduling may be calculated using the following equation.

$$\sum_{i=0}^{M-1} 44 \cdot N(i) \qquad \text{[Equation 1]}$$

In Equation 1, M indicates the number of DL CCs of a PDCCH monitoring CC set. The DL CCs of the PDCCH monitoring CC set are numbered i=0, 1, ..., (M−1). N(i) indicates the number of DL CCs that may be scheduled from the DL CC i.

For example, it is assumed that two DL CCs exist in a PDCCH monitoring CC set (hereinafter referred to PDCCH monitoring DL CCs) and the number of CCs on which a PDSCH/PUSCH are transmitted (i.e., PDSCH/PUSCH CCs) is 4. In this case, it is assumed that the size of the CSS of the PDCCH monitoring DL CC for the PDSCH/PUSCH CC is the same as that of non-cross-carrier scheduling.

In case of the method 1, UE twice repeats the blind decoding of one PDCCH monitoring DL CC for the two PDSCH/PUSCH CCs, and thus the maximum number of times of blind decoding attempts is 2×2×44=176. In case of the method 2, UE has to perform the blind decoding of the two monitoring DL CCs for the four PDSCH/PUSCH CCs, and thus the maximum number of times of blind decoding attempts is 4×2×44=352. That is, in the method 2, blind decoding attempts much greater than that of the method 1 must be made.

If the method 1 is used, in case of a non cross-carrier scheduling or cross-carrier scheduling, a plurality of DL CCs other than one PDCCH monitoring CC need not to be monitored for one PDSCH or PUSCH in a specific subframe, and blind decoding overhead of Rel-8 is necessary for every DL CC. However, unlike in the method 2, it is difficult to support full flexible scheduling because scheduling has limitations. If the method 2 is used, full flexible scheduling may be supported, but excessive blind decoding complexity may occur from a viewpoint of UE.

A method taking advantages of the method 1 and the method 2 is described below.

[Method 3]

A BS first configures only one DL CC on which a relevant PDCCH is transmitted for PDSCH/PUSCH CCs. The DL CC having a CIF (that UE monitors the PDCCH) may schedule at least one of the PDSCH of the DL CC and/or the PUSCH of a UL CC linked to the DL CC. Here, if the relevant PDCCH has the same DCI payload size from among the PDSCH/PUSCH CCs, a search space may be shared.

Figure 29:
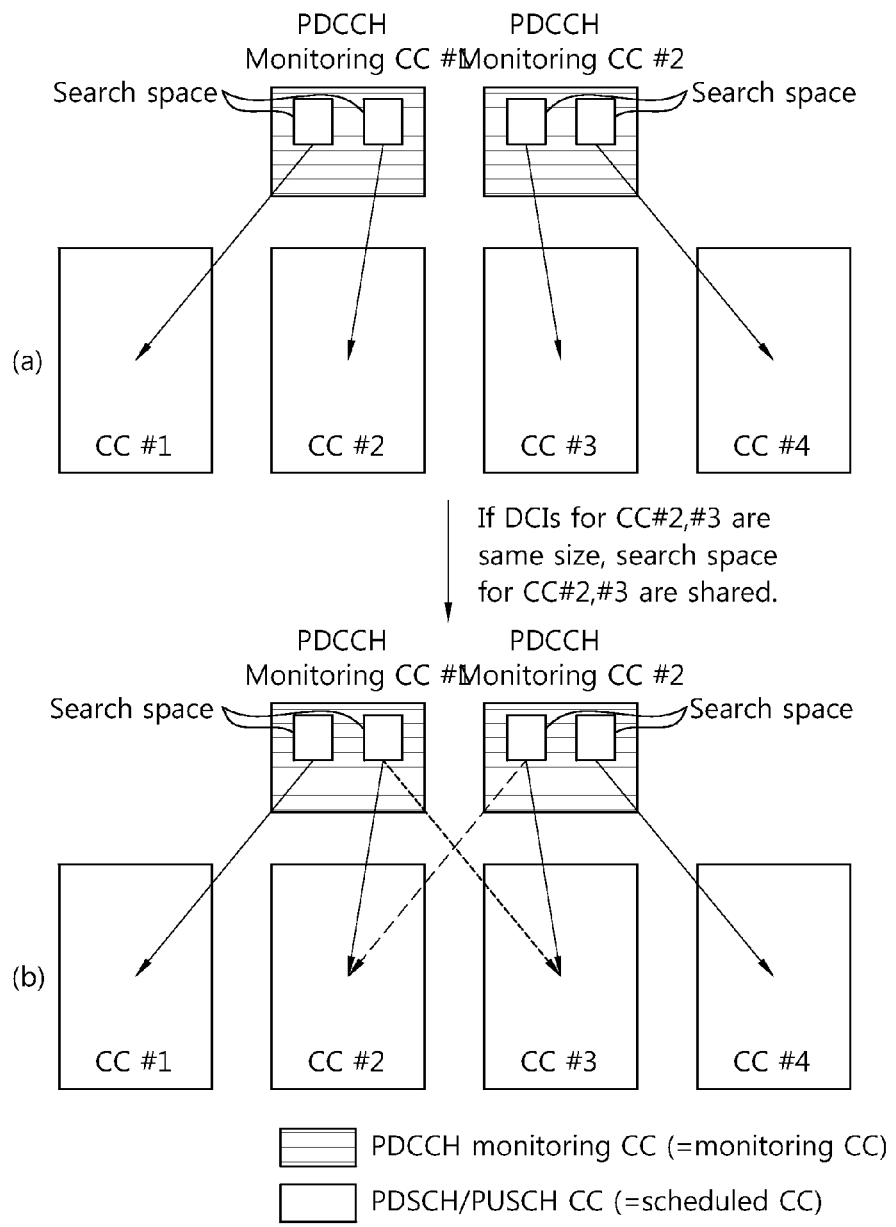
FIG. 29 is a diagram illustrating the above method 3.

FIG. 29 is a diagram illustrating the above method 3.

Referring to FIG. 29(a), a PDCCH monitoring DL CC #1 transmits a PDCCH for a CC #1 and CC #2, and a PDCCH monitoring DL CC #2 transmits a PDCCH for a CC #3 and a CC #4, Here, if the DCI payload size of the PDCCH for the CC #2 is the same as the DCI payload size of the PDCCH for the CC #3, a search space for the CC #2 and the CC #3 may be shared as in FIG. 29(b).

A DL CC through which UE monitors a PDCCH is hereinafter called a monitoring CC, for convenience sake. Furthermore, a DL CC through which UE receives a PDSCH is called a PDSCH CC, and a UL CC through which UE transmits a PUSCH is called a PUSCH CC. The PDSCH CC and the PUSCH CC are collectively called a scheduled CC.

For example, it is assumed that a scheduled CC #2 and a monitoring CC #1 are linked and a scheduled CC #3 and the monitoring CC #2 are linked. In this case, UE first monitors the monitoring CC #1 in order to receive the PDCCH of the scheduled CC #2 and monitors the monitoring CC #2 in order to receive the PDCCH of the scheduled CC #3. If the PDCCH of the scheduled CC #2 and the PDCCH of the scheduled CC #3 have the same DCI size, however, a search space may be shared. That is, if the DCI size is the same, the UE can first monitor the PDCCH even in DL CCs other than the linked monitoring CC. For example, the UE can monitor not only the monitoring CC #1, but also the monitoring CC #2 for the scheduled CC #2.

In the above method, the search space of relevant PDCCHs is shared only when a PDCCH for a scheduled CC that may be received in one or more monitoring CCs has the same DCI payload size. Furthermore, if PDCCHs for scheduled CCs that may be received in one or more monitoring CCs have different DCI payload sizes, (priority) linkage is maintained as in the method 1. Through this method, blind decoding complexity can maintain a specific level, and the scheduling flexibility of a BS can be improved.

Upon cross-carrier scheduling, pieces of DCIs for one or more scheduled CCs may be detected in a monitoring CC. For example, as in the above method 3, pieces of DCI about one or more scheduled CCs may be detected in two or more monitoring CCs because a search space is shared, or pieces of DCI about one or more scheduled CCs may be detected in one monitoring CC because a search space is shared. If a search space is shared between PDCCHs having the same DCI size, plural pieces of DCI having the same DCI size may be detected. In this case, UE may know that a PDCCH is its own PDCCH through CRC included in a process of receiving the PDCCH, but it may be difficult for the UE to know that detected DCI is DCI for what scheduled CC. This is called the ambiguity of DCI.

For example, in a monitoring CC using cross-carrier scheduling, DCI including a CIF and DCI not including a CIF may have the same DCI payload size in a search space. Here, ambiguity occurs because UE is unable to know whether a detected PDCCH is information about the DCI including the CIF or information about the DCI not including the CIF (if cross-carrier scheduling is used and a CIF is included in all pieces of DCI within a monitoring CC, ambiguity is not generated because it may know that relevant DCI is information about what scheduled CC through a CIF).

Figure 30:
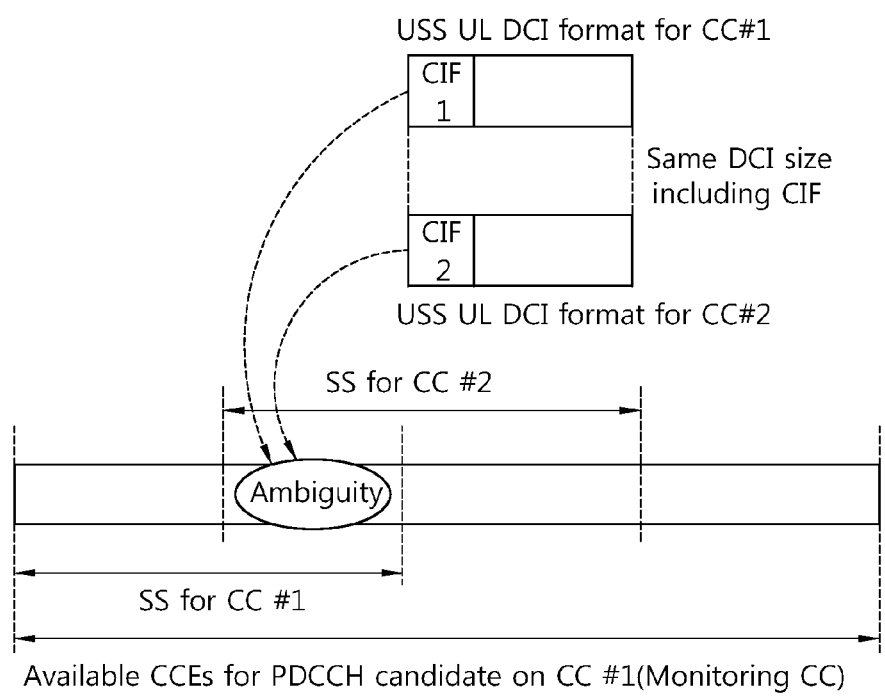
FIG. 30 shows an example in which the ambiguity of DCI is generated.

FIG. 30 shows an example in which the ambiguity of DCI is generated.

It is assumed that pieces of control information (i.e., DCI) about a CC #1 and a CC #2 are transmitted through the CC #1. Here, the Search Space (SS) of the DCI for the CC #1 and the SS of the DCI for the CC #2 may fully overlap with each other or may partially overlap with each other. The SS may be a Common Search Space (CSS) or a UE-specific Search Space (USS) or may differ for every CC. For example, the SS for the CC #1 may be a CSS, and the SS for the CC #2 may be a USS.

If the search spaces overlap with each other, the DCI of the CC #1 or the DCI of the CC #2 may or may not include the CIF. If the DCI of the CC #1 and the DCI of the CC #2 have the same payload size, it is not clear whether the DCI detected in the overlapped search space includes or does not include the CIF.

as another problem, if the search spaces of control information about different CCs overlap with each other, CIF values included in DCI payloads that may be subject to blind decoding in an overlapping search space may have the same value. In this case, there is ambiguity about how pieces of DCI information placed after a CIF will be interpreted. In particular, this problem may occur when one DCI is for uplink and the other DCI is for downlink.

The following table shows an example of the payload sizes of DCI formats. Each of bandwidths indicates the number of resource blocks, and the payload size of each DCI format is indicated by the number of bits.

TABLE 1

| Bandwidth (RB) | 6 | 15 | 25 | 50 | 75 | 100 |
|---|---|---|---|---|---|---|
| Format 0 | 37 | 38 | 41 | 43 | 43 | 44 |
| Format 1A | 37 | 38 | 41 | 43 | 43 | 44 |
| Format 3/3A | 37 | 38 | 41 | 43 | 43 | 44 |
| Format 1C | 24 | 26 | 28 | 29 | 30 | 31 |
| Format 1 | 35 | 39 | 43 | 47 | 49 | 55 |
| Format 1B (2 tx ant) | 38 | 41 | 43 | 44 | 45 | 46 |
| Format 1D (2 tx ant) | 38 | 41 | 43 | 44 | 45 | 46 |
| Format 2 (2 tx ant) | 47 | 50 | 55 | 59 | 61 | 67 |
| Format 2A (2 tx ant) | 44 | 47 | 52 | 57 | 58 | 64 |
| Format 1B (4 tx ant) | 41 | 43 | 44 | 46 | 47 | 49 |
| Format 1D (4 tx ant) | 41 | 43 | 44 | 46 | 47 | 49 |
| Format 2 (4 tx ant) | 50 | 53 | 58 | 62 | 64 | 70 |
| Format 2A (4 tx ant) | 46 | 49 | 54 | 58 | 61 | 66 |
| Format 2B | 44 | 47 | 52 | 57 | 58 | 64 |

The sizes of DCI formats that may be assumed with consideration taken of padded and added padding bits when a CIF of, for example, 3 bits is added to the payloads of the DCI formats, such as those listed in the above table, and then subject to rate matching are as follows as in the following table.

TABLE 2

| | Bandwidth | 6 | 15 | 25 | 50 | 75 | 100 |
|---|---|---|---|---|---|---|---|
| With CIF | Format 0/1A | 39 | (41) | ((43)) | 45 | (((46))) | 47 |
| | Format 1 | 38 | 42 | (((46))) | 50 | 52 | 58 |
| | Format 1B/1D (2 tx ant) | (41) | ((43)) | 45 | 47 | 49 | 49 |
| | Format 2 (2 tx ant) | 50 | 53 | 58 | 62 | 64 | 70 |
| | Format 2A (2 tx ant)/2B | 47 | 50 | 55 | 59 | 61 | 67 |
| | Format 1B/1D (4 tx ant) | ((43)) | 45 | 47 | 49 | 50 | 51 |
| | Format 2 (4 tx ant) | 53 | 57 | 61 | 65 | 67 | 73 |
| | Format 2A (4 tx ant) | 49 | 52 | 57 | 61 | 63 | 69 |

Figure 31:
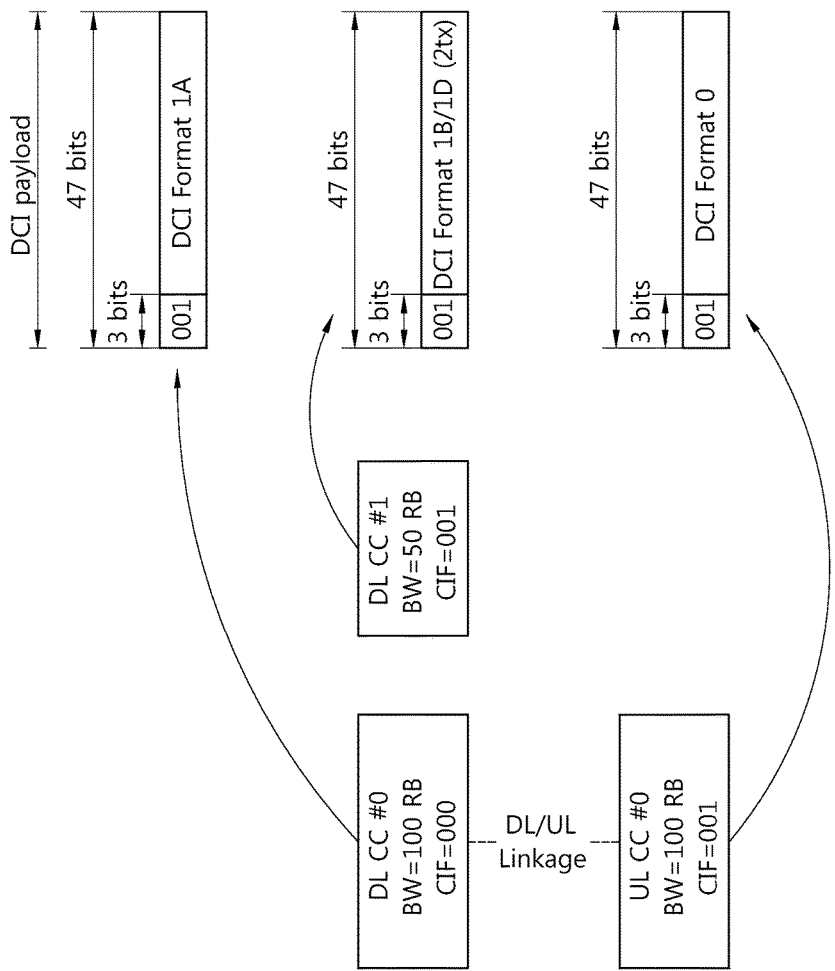
FIG. 31 shows another example shows the ambiguity of DCI.

FIG. 31 shows another example shows the ambiguity of DCI.

Referring to FIG. 31 and Table 2, a DL CC#0 has a bandwidth of 100 RB, and a DL CC#1 has a bandwidth of 50 RB. Furthermore, the DL CC#0 is linked to a UL CC#0 having a bandwidth of 100 RB. It is also assumed that pieces of DCI for the DL CC#0, the DL CC#1, and the UL CC#0 may be transmitted in the search space of the DL CC#0. Furthermore, it is assumed that the CIF of the DL CC#0 is 0, the CIF of the DL CC#1 is 1, and the CIF of the UL CC#0 is 1.

In this case, for example, the DCI format 1A for the DL CC#0, the DCI format 1B/1D (2 tx ant) for the DL CC#1, and the DCI format 0 for the UL CC#0 may have the same DCI payload size (47 bits). Here, there is ambiguity that UE is unable to distinguish the DCI format 1B/1 D (2 tx ant) of the DL CC#1 and the DCI format 0 of the UL CC#0 to which the same CIF is assigned from each other. In the above example, there is no problem in distinguishing the DCI format 1A and the DCI format 0 from each other although the same CIF is assigned to the DCI format 1A and the DCI format 0 because information of 1 bit for distinguishing the DCI format 1A and the DCI format 0 from each other exists within the DCI payload.

As described in the above-described example, a solution for preventing the ambiguity of DCI from occurring is a method of exclusively setting the CIF value of a UL CC and the CIF value of a DL CC. That is, in this method, UE may distinguish relevant DCI is for a UL CC or a DL CC through a CIF included in the DCI.

Figure 32:
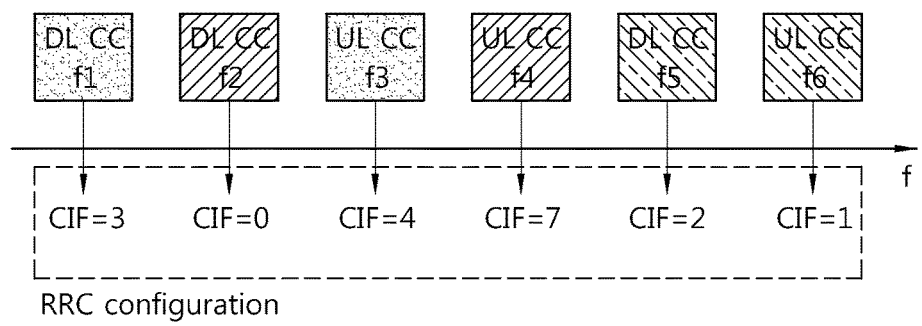
FIG. 32 shows an example of a method of exclusively indexing the indices of UL CCs and DL CCs.
Figure 32:
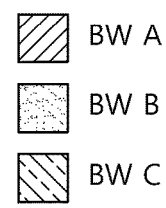

FIG. 32 shows an example of a method of exclusively indexing the indices of UL CCs and DL CCs.

Referring to FIG. 32, a BS may exclusively assign the indices of DL CCs and UL CCs through a high layer signal, such as RRC. That is, in this method, CIF values are exclusively assigned to all the DL CCs and UL CCs irrespective of the bandwidths of the DL CCs and the UL CCs.

This method is disadvantageous in that the number of CCs that may be indexed is limited because a CIF having a specific size (the number of bits) is used in all the DL CCs and UL CCs. A method of solving the disadvantage is described below.

Figure 33:
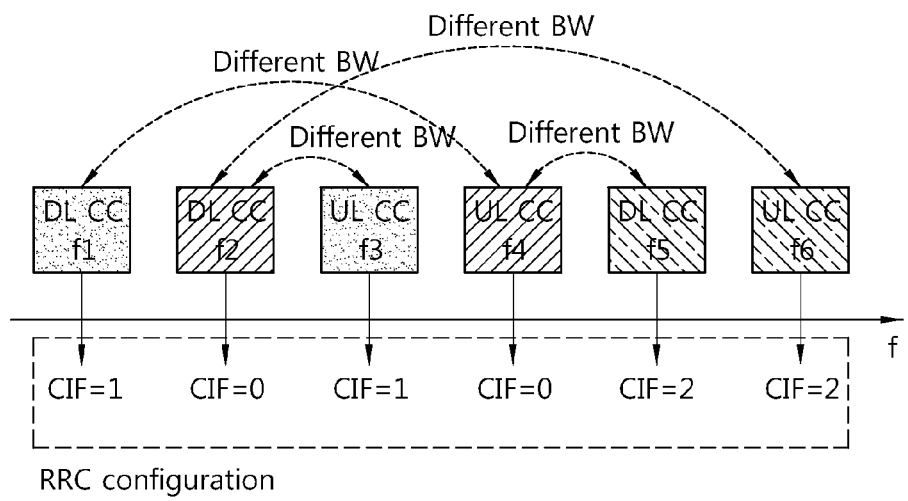
FIG. 33 shows another example of the method of exclusively indexing UL CCs and the indices of DL CCs.
Figure 33:

FIG. 33 shows another example of the method of exclusively indexing UL CCs and the indices of DL CCs.

Referring to FIG. 33, a BS may assign different CIF value to only a DL CC and a UL CC having different bandwidths. For example, it is assumed that a DL CC f2 and a UL CC f4 are linked and are CCs each having a bandwidth (BW) A, a DL CC f1 and a UL CC f3 are linked and are CCs each having a BW B, and a DL CC f5 and a UL CC f6 are linked and are CCs each having a BW C. Here, the BW A, the BW B, the BW C have different values.

In the above example, CIF values are exclusively assigned to CCs having different bandwidths. However, the same CIF value may be assigned to CCs having the same bandwidth. A DL CC and a UL CC having the same bandwidth have different payload sizes between different DCI formats, or have the same payload size and search spaces are distinguished from each other (whether each of the search spaces is a CSS or a USS), or information for distinguishing the DCI formats from each other is included in the payload. Accordingly, although the DL CC and the UL CC having the same bandwidth have the same CIF value, the ambiguity of DCI is not occurred. As described above, however, since the ambiguity of DCI may occur in CCs having different bandwidths, exclusive CIF values are assigned to the CCs so that the CCs can be distinguished from each other.

An example in which a DL CC and UL CC that are linked have the same bandwidth and the same CIF value has been described in FIG. 33, but not limited thereto. That is, the linked DL CC and UL CC may have different bandwidths. In this case, the linked DL CC and UL CC may have different CIF values. A BS may inform UE of the CIF values of the DL CC and the UL CC through RRC signaling.

<Method of Indexing Monitoring CC (CC)-Specific CCs>

A method of indexing DL CCs and/or UL CCs according to a monitoring CC, a CC on which a PDCCH for scheduling a scheduled CC is transmitted (in this sense, the monitoring CC may be called a scheduling CC), is described below.

A method of representing all DL CCs and UL CCs using limited CIF bits is problematic in that all the DL CCs and UL CCs cannot be represented using the limited CIF bits if the number of DL CCs and UL CCs is increased. Accordingly, a method of defining the interpretation of the value of a CIF on the basis of a monitoring CC (i.e., a scheduling CC) not a UE-specific value may be taken into consideration. This method may be applied to both UL CCs and DL CCs. In this method, the same CIF value may exist in DL CCs included in UE-specific CCs, and the same CIF value may exist in UL CCs.

Figure 34:
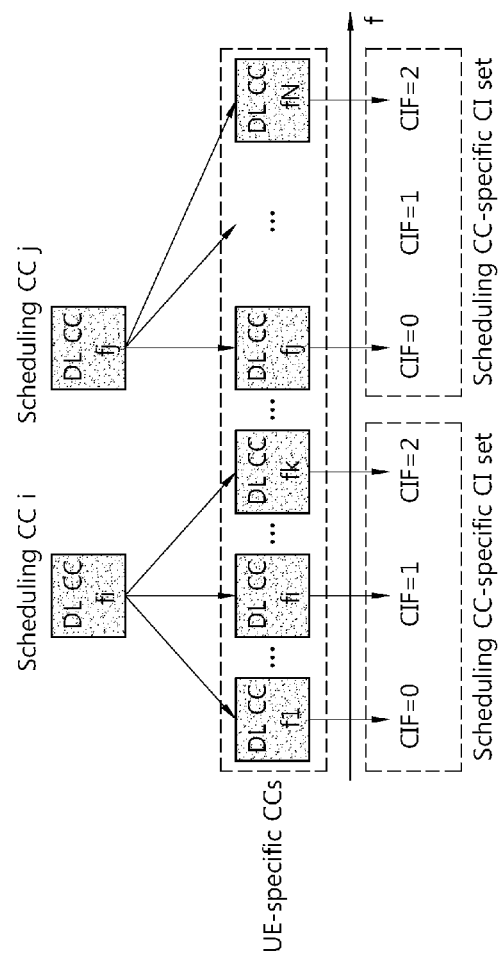
FIG. 34 shows an example of a method of indexing scheduling CC-specific CCs.

FIG. 34 shows an example of a method of indexing scheduling CC-specific CCs.

Referring to FIG. 34, a total of N UE-specific CCs may exist (a DL CC f1 to a DL CC fN), and M DL CCs of the N DL CCs may be scheduling CCs (i.e., monitoring CCs on which PDCCHs are transmitted). Here, scheduled DL CCs may be grouped for every scheduling CC included in the M scheduling CCs, respectively. For example, an $i^{th}$ scheduling CC, from among the M scheduling CCs, may schedule $n_i$ DL CCs from among the N DL CCs, and an $j^{th}$ scheduling CC, from among the M scheduling CCs, may schedule $n_j$ DL CCs from among the N DL CCs. A BS may previously define linkage between the scheduling CC and the scheduled DL CC through a high layer signal, such as RRC.

In the above example, scheduled DL CC grouped into one scheduling CC may be assigned a unique CIF value (this value is called a Carrier Index (CI)), and it may have a CIF value redundant with those of scheduled DL CCs grouped into another scheduling CC. UE already knows a scheduling CC on which the index of a scheduled DL CC is obtained and thus knows that a CIF value included in the scheduling CC indicates what physical DL CC (scheduled DL CC). A CC index specific to the scheduling CC may be transmitted through RRC or an L1 control channel.

Figure 35:
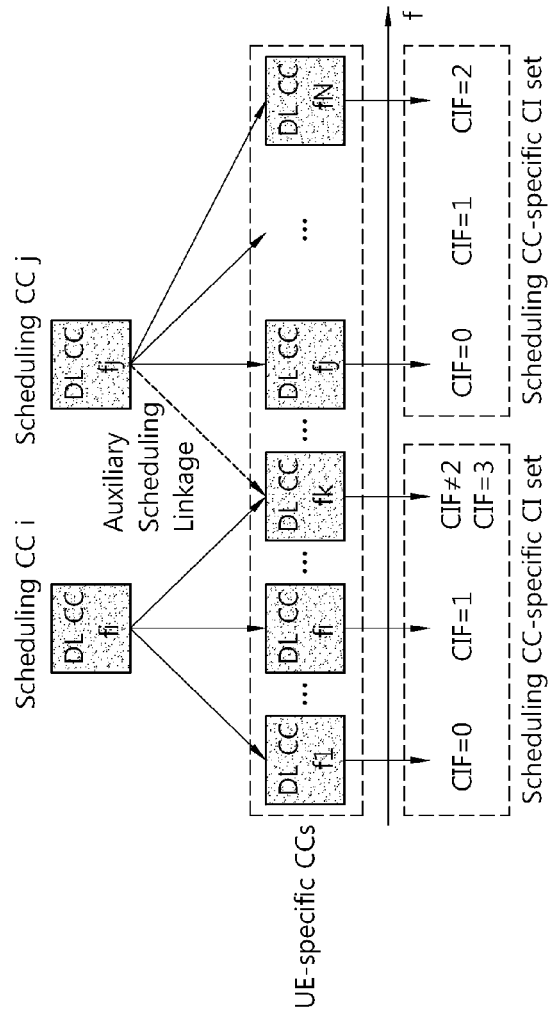
FIG. 35 shows another example of the method of indexing scheduling CC-specific CCs.

FIG. 35 shows another example of the method of indexing scheduling CC-specific CCs.

FIG. 35 differs from FIG. 34 in that the number of scheduling CCs for a scheduled CC is not one, but plural. For example, a DL CC fK may be scheduled by a scheduling CC i or may be scheduled by a scheduling CC j. In this case, the DL CC fK must have a unique value within a scheduled DL CC set linked to the scheduling CC i and must have a unique value within a scheduled DL CC set linked to the scheduling CC j. That is, in FIG. 35, if the DL CC fK has a CIF value of 2 and the DL CC fK is scheduled by the scheduling CC j, the CIF value of the DL CC fK overlaps with the CIF value of the DL CC fN. Accordingly, a unique value of 3 (e.g., the CIF value) is assigned to the DL CC fK.

Although the method of indexing DL CCs has been described in the above example, it is evident that the above example may also be applied to UL CCs. Furthermore, the above example may also be applied to a case where a scheduling CC schedules a set of scheduled CCs which includes both a DL CC and a UL CC.

Figure 36:
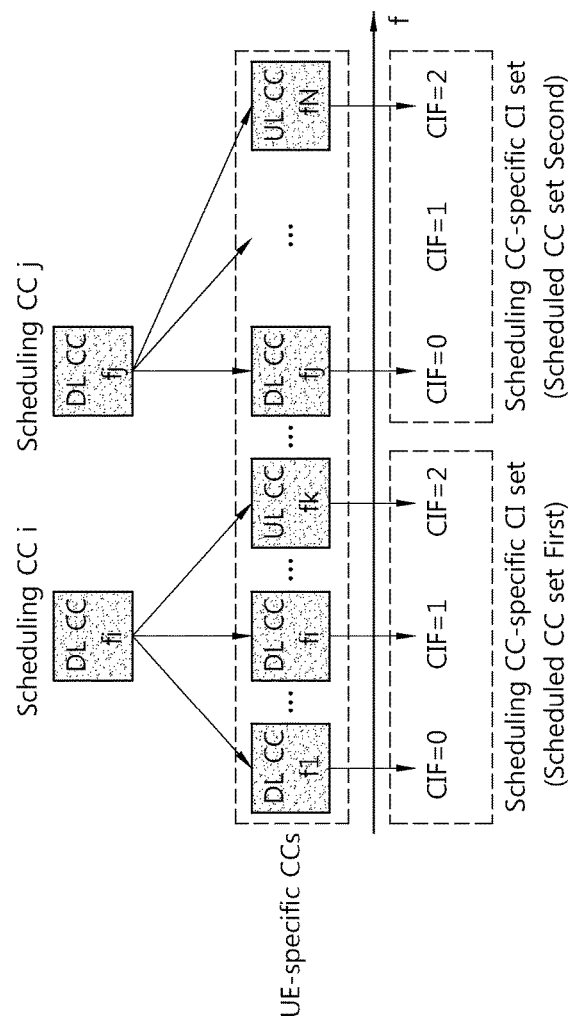
FIG. 36 shows yet another example of the method of indexing scheduling CC-specific CCs.

FIG. 36 shows yet another example of the method of indexing scheduling CC-specific CCs.

Referring to FIG. 36, both DL CCs and UL CCs may be included in a scheduled CC group scheduled by each scheduling CC. In this case, a DL CC and a UL CC have unique values within a first scheduled CC group so that they do not have a redundant CIF value. A DL CC or a UL CC belonging to a second scheduled CC group have unique values so that they do not have a redundant CIF value. However, CCs belonging to the second scheduled CC group and CCs belonging to the first scheduled CC group may have redundant CIF values. That is, CCs have exclusive and unique CIF values within the same scheduled CC group, but may have the same CIF value in other scheduled CC groups. Although the number of bits of a CIF is limited, a total number of bits capable of indicating CCs may be increased through the above-described method. Since a DL CC and a UL CC have unique CIF values within each scheduled group, it is possible to determine whether a relevant PDCCH is for a DL CC or for a UL CC by using only a CIF value.

<Method of Configuring the Index of a UL CC Based on a Link>

A method of configuring the index of a UL CC based on a link is described below.

If a DL CC and a UL CC that are linked have the same bandwidth, a method of the DL CC and the UL CC reusing the same index may be taken into account. If this method is used, the index of the UL CC is automatically determined according to the index of the DL CC.

Figure 37:
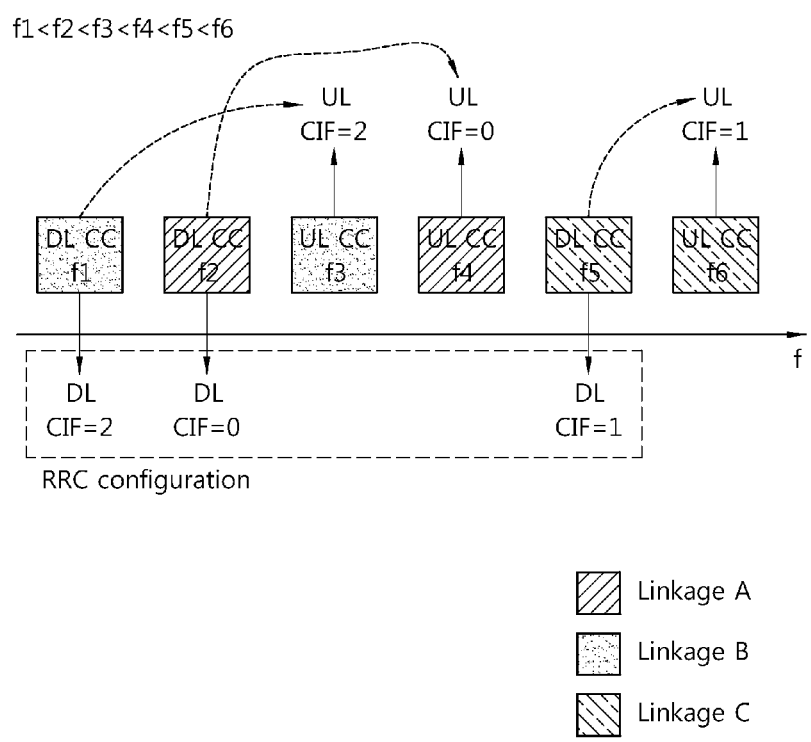
FIG. 37 shows an example in which the same index is assigned to a linked DL CC and UL CC.

FIG. 37 shows an example in which the same index is assigned to a linked DL CC and UL CC.

Referring to FIG. 37, the same CIF value '2' is assigned to a DL CC f1 and a UL CC f3 that are linked. Likewise, the same CIF value '0' is assigned to a DL CC f2 and a UL CC f4 that are linked. Furthermore, the same CIF value '1' is assigned to a DL CC f5 and a UL CC f6 that are linked. The link between the DL CC and the UL CC may comply with the existing rule (e.g., linkage defined in LTE Rel-8) or may comply with dedicated linkage assigned by a BS through a high layer signal, such as RRC. This method may also be applied within the above-described scheduling CC-specific scheduled CC group.

The method of assigning the indices of UL CCs according to a link may have DCI ambiguity as described above if a DL CC and a UL CC that are linked have different bandwidths.

Figure 38:
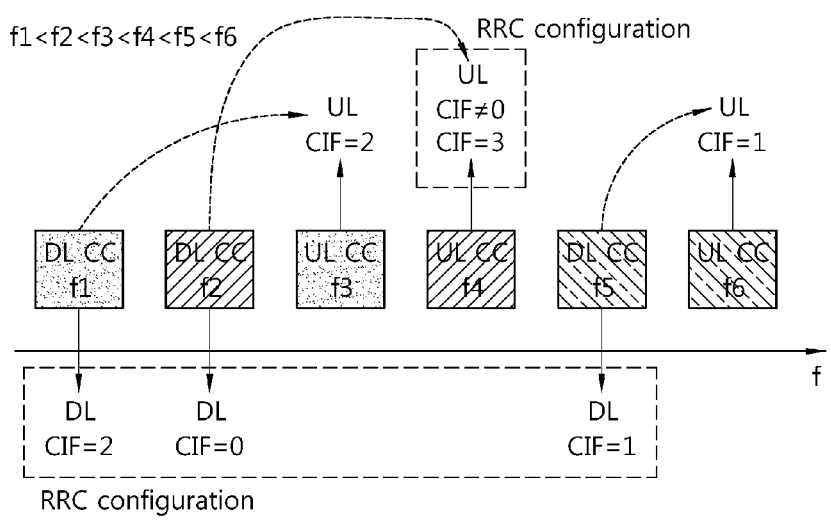
FIG. 38 shows a method that may be applied when a DL CC and a UL CC have different bandwidths if the indices of UL CCs are assigned according to a link.

FIG. 38 shows a method that may be applied when a DL CC and a UL CC have different bandwidths if the indices of UL CCs are assigned according to a link.

Referring to FIG. 38, a DL CC f2 and a UL CC f4 that are linked have different bandwidths. In this case, the UL CC f4 is assigned a unique CIF value different from the CIF value of the DL CC f2. The unique index value may be assigned through RRC or may be assigned using an implicit method. A method of automatically assigning, for example, a minimum value or a maximum value, from among the indices of DL CCs now not used, may be used as the implicit method. Although FIG. 38 shows an example in which only one UL CC has a different bandwidth from the DL CCs, a plurality of UL CCs may have different bandwidths from a DL CC linked thereto. In this case, a maximum value or a minimum value, from among the index values of DL CCs not assigned may be assigned to one UL CC, and unique indices may be assigned in frequency-ascending order or frequency-descending order.

In applying the method of assigning the indices of UL CCs according to a link, a specific DL CC may be deactivated and a UL CC linked to the specific DL CC may set up a new link with another activated DL CC, or a DL CC linked to a plurality of UL CCs may be deactivated. That is, if a link needs to be set up, how the indices of the plurality of UL CCs will be assigned using unique values is problematic.

Figure 39:
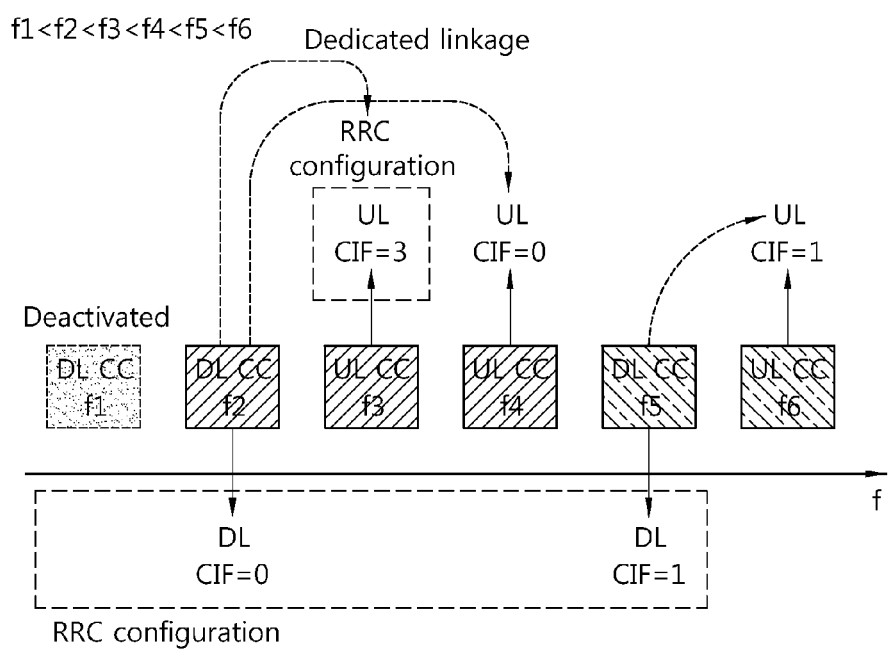
FIG. 39 shows a method of indexing a plurality of UL CCs when the plurality of UL CCs is linked to one DL CC.

FIG. 39 shows a method of indexing a plurality of UL CCs when the plurality of UL CCs is linked to one DL CC.

Referring to FIG. 39, a plurality of UL CCs linked to one DL CC may not be automatically assigned indices according to linkage, but may be assigned exclusive UL CC index values through an RRC configuration. Alternatively, the implicit method (e.g., a minimum value or a maximum value, from among DL CC indices now not being used may be automatically assigned to one of the plurality of UL CCs and the remaining UL CCs may be assigned indices in frequency-ascending order or frequency-descending order) may be used.

In the various methods of assigning the indices of UL CCs using a link, a CIF value included in an UL grant may indicate the index value of a DL CC linked to a UL CC for the transmission of a PUSCH or the transmission of control information without configuring the index of the UL CC. Furthermore, the methods of assigning the indices of UL CCs may be applied within a scheduling CC-specific scheduled CC group.

Alternatively, a problem may be solved by independently assigning the indices of a DL CC and a UL CC and adding padding bits to any one of uplink DCI and downlink DCI that may have a problem, such as DCI ambiguity. This method may also be applied within a scheduling CC-specific scheduled CC group.

Alternatively, predetermined additional scrambling may be applied to any one of a DCI payload for downlink and a DCI payload for uplink. For example, in case of the DCI payload for downlink, a scrambling code may be transmitted like in LTE Rel-8/9. In case of the DCI payload for uplink, a scrambling code previously defined between UE and a BS, having a pattern specific to a DCI payload including a CIF, may be transmitted. In this case, the UE may check whether the DCI payload is for a DCI format for uplink or a DCI format for downlink by scrambling the scrambling code and then performing CRC.

Alternatively, any one of DCI for downlink and DCI for uplink may not be transmitted in a search space where the DCI for downlink and the DCI for uplink are overlapped with each other or shared. That is, a scheduler may schedule only uplink DCI in the search space section where the DCI for downlink and the DCI for uplink are overlapped with each other or shared. For example, only a DCI format 0 for a UL CC #0 may be transmitted even in the overlapping search space section, and a DCI format for a DL CC #1 may be transmitted only in an non-overlapping search space section. UE may automatically determine that the payload size of a specific bit detected in the overlapping search space section is uplink DCI. Alternatively, a scheduler may transmit downlink DCI in the overlapping search space section. According to this method, UE may determine that DCI detected in the overlapping search space section is DCI for downlink or DCI for uplink according to a predetermined rule.

Alternatively, DCI transmitted in an overlapped or shared search space section may be limited to DCI for a primary CC. In this case, the primary CC may be defined for every UE. If one or more monitoring CCs (i.e., CC on which a PDCCH may be transmitted) are assigned to UE, a primary DL CC/UL CC may be defined for every monitoring CC. The ambiguity of a DCI size can be solved by setting one of PDSCH/PUSCH CC that may be scheduled as the primary CC through a relevant monitoring CC and then using the priority of DCI.

The primary CC for each monitoring CC may be set as a UL CC linked to the monitoring CC on a system configuration, a CC linked to the monitoring CC first of all, a DL/UL CC that is the subject of self-scheduling in the monitoring CC, and so on.

Figure 40:
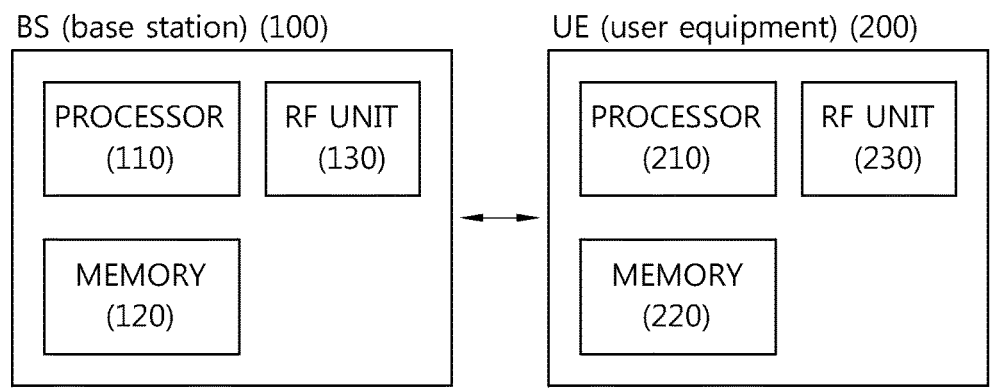
FIG. 40 is a block diagram showing a base station and user equipment.

FIG. 40 is a block diagram showing a BS and UE.

The BS 100 includes a processor 110, memory 120, and a Radio Frequency (RF) unit 130. The processor 110 implements the proposed functions, processes, and/or methods. For example, the processor 110 may inform UE of the linkage and/or indices of a DL CC and a UL CC through a high layer signal, such as RRC. Furthermore, the processor 110 may inform the UE whether cross-carrier scheduling has been activated through a high layer signal. Downlink Control Information (DCI) transmitted to UE may include a CIF. The memory 120 is coupled to the processor 110, and it stores various pieces of information for driving the processor 110. The RF unit 130 is coupled to the processor 110, and it transmits and/or receives radio signals.

The UE 200 includes a processor 210, memory 220, and an RF unit 230. The processor 210 implements the proposed functions, processes, and/or methods. For example, the processor 210 determines the indices of a plurality of DL CCs and a plurality of UL CCs. Furthermore, the processor 210 receives DCI through at least one of the plurality of DL CCs from a BS and transmits an uplink signal to the BS through a UL CC determined based on the DCI. Methods of determining the indices of DL CCs and UL CCs have been described above. The memory 220 is coupled to the processor 210, and it stores various pieces of information for driving the processor 210. The RF unit 230 is coupled to the processor 210, and it transmits and/or receives radio signals.

The processor 110, 210 may include Application-Specific Integrated Circuits (ASICs), other chipsets, logic circuits, or data processors and/or converters for mutually converting baseband signals and radio signals. The OFDM transmitter and the OFDM receiver of FIG. 7 may be implemented in the processor 110, 120. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented using a module (process or function) for performing the above functions. The module may be stored in the memory 120, 220 and executed by the processor 110, 210. The memory 120, 220 may be placed inside or outside the processor 110, 210 and connected to the processor 110, 210 using a variety of well-known means.

Although the some embodiments of the present invention have been described above, a person having ordinary skill in the art will appreciate that the present invention may be modified and changed in various ways without departing from the technical spirit and scope of the present invention. Accordingly, the present invention is not limited to the embodiments and the present invention may be said to include all embodiments within the scope of the claims below.

The invention claimed is:

1. A method for determining a carrier indicator field (CIF) value for an uplink component carrier (UL CC) in a carrier-aggregation system, the method performed by a user equipment (UE) and comprising:

receiving a first physical downlink control channel (PDCCH) through a first downlink component carrier (DL CC) among a plurality of DL CCs and a second PDCCH through a second DL CC among the plurality of DL CCs, the first PDCCH including a CIF indicating a CIF value for the first DL CC and the second PDCCH including a CIF indicating a CIF value for the second DL CC;

acquiring the CIF value for the first DL CC using the first PDCCH and the CIF value for the second DL CC using the second PDCCH;

determining a CIF value for a first UL CC that is linked to the first DL CC and a CIF value for a second UL CC that is linked to the second DL CC; and transmitting a first signal to a base station based on the CIF value for the first UL CC and a second signal to the base station based on the CIF value for the second UL CC, wherein the CIF value for the first UL CC is determined by subtracting the CIF value for the first DL CC from a maximum value and the CIF value for the second UL CC is determined by subtracting the CIF value for the second DL CC from the maximum value, and wherein the first UL CC, the second UL CC, the first DL CC, and the second DL CC use frequencies different than each other.

2. The method of claim 1, wherein if the CIF is 3 bits, the maximum value is 7.

3. A user equipment (UE) comprising:

a radio frequency (RF) unit configured to transmit and receive radio signals; and a processor connected to the RF unit, wherein the processor is configured to:

receive, via the RF unit, a first physical downlink control channel (PDCCH) through a first downlink component carrier (DL CC) among a plurality of DL CCs and a second PDCCH through a second DL CC among the plurality of DL CCs, the first PDCCH including a CIF indicating a CIF value for the first DL CC and the second PDCCH including a CIF indicating a CIF value for the second DL CC, acquire the CIF value for the first DL CC using the first PDCCH and the CIF value for the second DL CC using the second PDCCH, determine a CIF value for a first UL CC that is linked to the first DL CC and a CIF value for a second UL CC that is linked to the second DL CC, and transmit, via the RF unit, a first radio signal to a base station based on the CIF value for the first UL CC and a second radio signal to the base station based on the CIF value for the second UL CC, wherein the processor determines the CIF value for the first UL CC is determined by subtracting the CIF value for the first DL CC from a maximum value and the CIF value for the second UL CC is determined by subtracting the CIF value for the second DL CC from the maximum value, and wherein the first UL CC, the second UL CC, the first DL CC, and the second DL CC use frequencies different than each other.

* * * * *